US012646197B2

(12) United States Patent
Hsieh et al.

(10) Patent No.: US 12,646,197 B2
(45) Date of Patent: Jun. 2, 2026

(54) DEPTH ESTIMATION BASED ON OBJECT BOTTOM POSITION

(71) Applicant: Google LLC, Mountain View, CA (US)

(72) Inventors: MingHung Hsieh, New Taipei City (TW); Shih-Yen Ku, New Taipei City (TW); Ray-Hon Sun, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 897 days.

(21) Appl. No.: 17/995,051

(22) PCT Filed: May 17, 2021

(86) PCT No.: PCT/US2021/032686
§ 371 (c)(1),
(2) Date: Sep. 29, 2022

(87) PCT Pub. No.: WO2021/247228
PCT Pub. Date: Dec. 9, 2021

(65) Prior Publication Data
US 2023/0127218 A1      Apr. 27, 2023

Related U.S. Application Data

(60) Provisional application No. 63/033,964, filed on Jun. 3, 2020.

(51) Int. Cl.
*G06K 9/00*        (2022.01)
*G01B 11/02*        (2006.01)
(Continued)

(52) U.S. Cl.
CPC .............. *G06T 7/70* (2017.01); *G01B 11/026* (2013.01); *G01C 3/08* (2013.01); *G06T 7/50* (2017.01);
(Continued)

(58) Field of Classification Search
CPC ........... G06T 7/50; G06T 7/521; G06T 7/536; G06T 7/571; G06T 7/60; G06T 7/70;
(Continued)

(56) References Cited

U.S. PATENT DOCUMENTS

| | | | | |
|---|---|---|---|---|
| 5,515,448 A | * | 5/1996 | Nishitani | .................. G06T 7/55 |
| | | | | 382/106 |
| 9,323,992 B2 | * | 4/2016 | Stein | .................... G06V 10/143 |

(Continued)

FOREIGN PATENT DOCUMENTS

| | | |
|---|---|---|
| CN | 106022304 | 10/2016 |
| WO | 2006/040215 | 4/2006 |

(Continued)

OTHER PUBLICATIONS

Intellectual Property India, First Examination Report mailed Feb. 10, 2023, issued in connection with Indian Patent Application No. 202247070660, 6 pages.

(Continued)

*Primary Examiner* — Eric Rush
(74) *Attorney, Agent, or Firm* — McDonnell Boehnen Hulbert & Berghoff LLP

(57)        ABSTRACT

A method may include receiving, from a camera, image data representing an object in an environment and determining, based on the image data, a vertical position within the image data of a bottom of the object. The method may also include determining an object bottom ratio between the vertical position and a height of the image data and determining, by way of a distance projection model and based on the object bottom ratio, an estimate of a physical distance between the camera and the object. The distance projection model may define, for each respective candidate object bottom ratio of a plurality of candidate object bottom ratios, a mapping between (i) the respective candidate object bottom ratio and (Continued)

(ii) a corresponding physical distance in the environment. The method may additionally include generating an indication of the estimate of the physical distance between the camera and the object.

20 Claims, 12 Drawing Sheets

(51) Int. Cl.
   *G01C 3/08*      (2006.01)
   *G06T 7/50*      (2017.01)
   *G06T 7/70*      (2017.01)
   *G06V 10/764*    (2022.01)

(52) U.S. Cl.
   CPC ........ *G06V 10/764* (2022.01); *G06V 2201/12* (2022.01)

(58) Field of Classification Search
   CPC ... G06T 7/73; G06T 7/77; G06T 2207/10004;
   G06T 2207/10016; G06T 2207/10028;
   G06T 2207/10048; G06T 2207/20081;
   G06T 2207/20084; G06T 2207/20104;
   G06T 2207/20228; G06T 2207/30196;
   G06V 10/22; G06V 10/25; G06V 10/255;
   G06V 10/40; G06V 10/70; G06V 10/764;
   G06V 10/82; G06V 20/10; G06V 20/50;
   G06V 20/52; G06V 20/60; G06V 20/64;
   G06V 2201/12; G01C 3/00; G01C 3/06;
   G01C 3/08; G01C 3/20; G01B 11/00;
   G01B 11/026; G01B 11/14; G01B 11/22;
   G01B 11/26
   USPC ....... 382/100, 103, 106, 153–156, 159, 160,
   382/173, 181, 224–227, 254, 255, 276,
   382/282, 286, 291, 312, 325; 348/61, 94,
   348/135–137, 140, 141, 143, 169–172;
   356/3, 3.01, 3.02, 3.03, 3.13, 4.01, 4.03,
   356/4.08, 11, 14, 15; 396/61, 62, 65, 67,
   396/70, 79, 80, 204; 702/97, 149, 152,
   702/158
   See application file for complete search history.

(56)            References Cited

U.S. PATENT DOCUMENTS

| | | | |
|---|---|---|---|
| 10,346,465 B2 | 7/2019 | Gao et al. | |
| 10,354,407 B2 | 7/2019 | Lablans | |
| 11,747,833 B2* | 9/2023 | Huang ...................... | G06T 7/50 |
| | | | 701/3 |
| 2006/0215881 A1* | 9/2006 | Nakajima ............ | G01B 11/024 |
| | | | 382/106 |
| 2007/0154068 A1* | 7/2007 | Stein .......................... | G06T 7/55 |
| | | | 382/106 |
| 2014/0152810 A1* | 6/2014 | Bae ........................... | G01C 3/12 |
| | | | 348/135 |
| 2016/0057352 A1* | 2/2016 | Yoneda ................. | H04N 23/689 |
| | | | 348/208.4 |
| 2016/0189342 A1* | 6/2016 | Gharavi-Alkhansari .................... | |
| | | | G06T 7/50 |
| | | | 345/660 |
| 2018/0045504 A1* | 2/2018 | Jiang ......................... | G06T 7/62 |
| 2019/0172214 A1* | 6/2019 | Cai ............................ | G06T 7/50 |
| 2020/0134853 A1* | 4/2020 | Milici ...................... | G06T 7/80 |
| 2020/0210726 A1* | 7/2020 | Yang ...................... | G06V 10/70 |

FOREIGN PATENT DOCUMENTS

| | | |
|---|---|---|
| WO | 2017/183769 | 10/2017 |
| WO | 2019/206270 | 10/2019 |

OTHER PUBLICATIONS

Brickwedde et al., "Exploiting single image depth prediction for mono-stixel estimation," Computer Vision—ECCV 2018 Workshops, ECCV 2018, Lecture Notes in Computer Science, 2018, 16 page, vol. 11129.

International Searching Authority, International Search Report and Written Opinion mailed on Sep. 10, 2021, issued in connection with International Patent Application No. PCT/US2021/032686, filed on May 17, 2021.

* cited by examiner

Front view         Right Side view         Back view

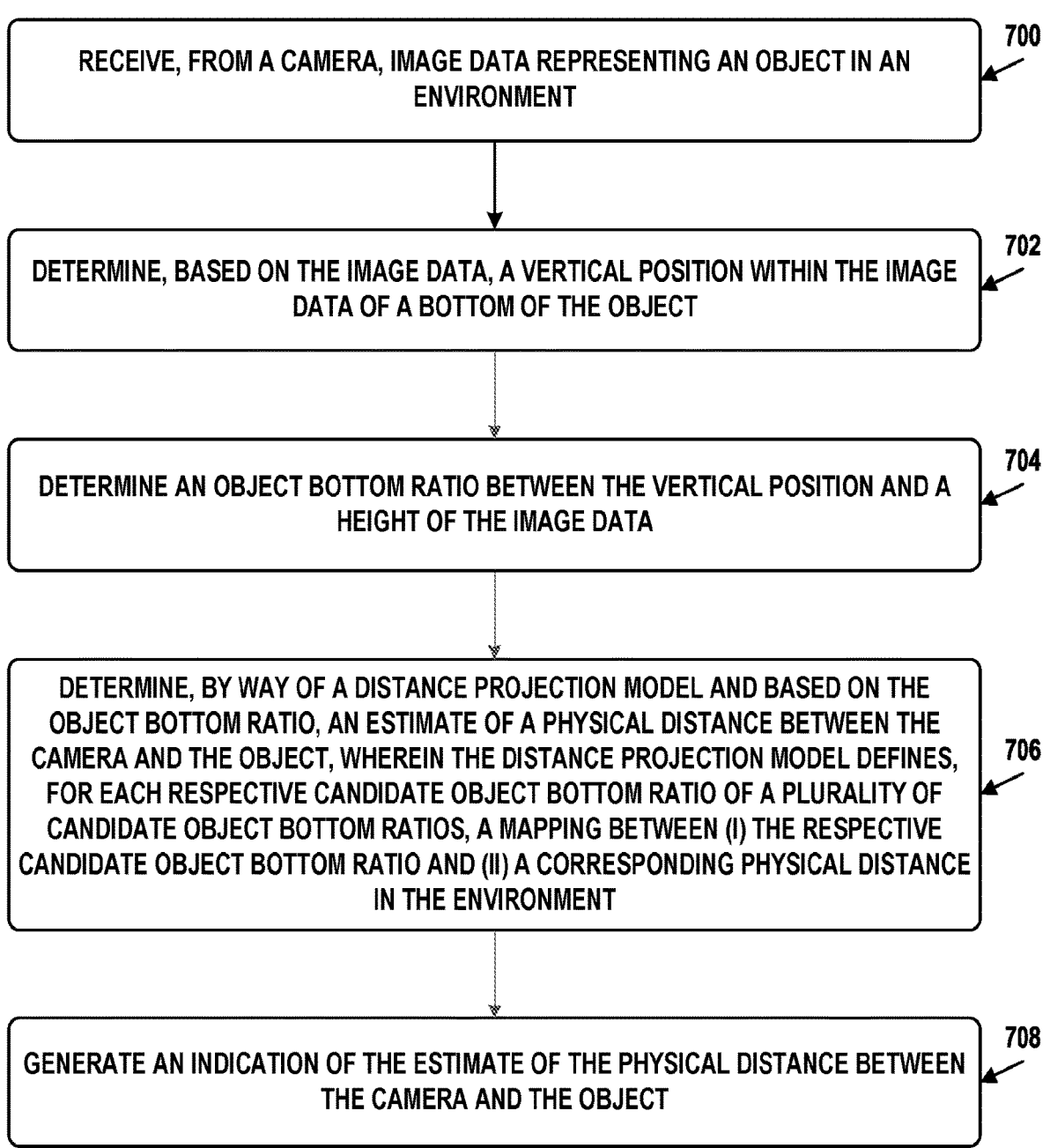

RECEIVE, FROM A CAMERA, IMAGE DATA REPRESENTING AN OBJECT IN AN ENVIRONMENT — 700

DETERMINE, BASED ON THE IMAGE DATA, A VERTICAL POSITION WITHIN THE IMAGE DATA OF A BOTTOM OF THE OBJECT — 702

DETERMINE AN OBJECT BOTTOM RATIO BETWEEN THE VERTICAL POSITION AND A HEIGHT OF THE IMAGE DATA — 704

DETERMINE, BY WAY OF A DISTANCE PROJECTION MODEL AND BASED ON THE OBJECT BOTTOM RATIO, AN ESTIMATE OF A PHYSICAL DISTANCE BETWEEN THE CAMERA AND THE OBJECT, WHEREIN THE DISTANCE PROJECTION MODEL DEFINES, FOR EACH RESPECTIVE CANDIDATE OBJECT BOTTOM RATIO OF A PLURALITY OF CANDIDATE OBJECT BOTTOM RATIOS, A MAPPING BETWEEN (I) THE RESPECTIVE CANDIDATE OBJECT BOTTOM RATIO AND (II) A CORRESPONDING PHYSICAL DISTANCE IN THE ENVIRONMENT — 706

GENERATE AN INDICATION OF THE ESTIMATE OF THE PHYSICAL DISTANCE BETWEEN THE CAMERA AND THE OBJECT — 708

Figure 7

DEPTH ESTIMATION BASED ON OBJECT BOTTOM POSITION

CROSS-REFERENCE TO RELATED APPLICATIONS

The present application is a National Stage Application under 35 U.S.C. § 371 and claims priority to International Patent Application No. PCT/US2021/032686, filed May 17, 2021, and titled "Depth Estimation Based on Object Bottom Position," which claims priority to U.S. Provisional Patent Application No. 63/033,964, filed on Jun. 3, 2020, and titled "Depth Estimation Based on Object Bottom Position," the entirety of each of which is hereby incorporated by reference as if fully set forth in this description.

BACKGROUND

A stereoscopic camera may be used to determine a distance or depth associated with an object. Specifically, the stereoscopic camera may simultaneously capture two or more images of the object. The distance or depth may be determined based on a known distance between image sensors of the stereoscopic camera and a disparity between representations of the object in the two or more simultaneously-captured images. Similarly, a camera may be used in combination with a structured light pattern projector to determine object distance or depth. Specifically, the distance or depth may be determined based on the extent to which the pattern is deformed, dispersed, or otherwise altered as the pattern is projected onto objects at different depths. In each approach, the depth or distance measurement involves imaging hardware that might not be available on some computing devices.

SUMMARY

Image data generated by a camera may be used to determine distances between the camera and objects represented within the image data. The estimated distance to an object may be determined by identifying a vertical position of a bottom of the object within the image data and dividing the vertical position by the total height of the image data to obtain an object bottom ratio. A distance projection model may map the object bottom ratio to a corresponding estimate of physical distance between the camera and the object. The distance projection model may operate under the assumption that the camera is positioned at a particular height within the environment and that the bottom of the object is in contact with a ground surface of the environment. Further, in cases where the image data is generated by a camera oriented at a non-zero pitch angle, an offset calculator may determine an offset to be added to the object bottom ratio to compensate for the non-zero camera pitch.

In a first example embodiment, a computer-implemented method is provided that includes receiving, from a camera, image data representing an object in an environment. The method also includes determining, based on the image data, a vertical position within the image data of a bottom of the object and determining an object bottom ratio between the vertical position and a height of the image data. The method additionally includes determining, by way of a distance projection model and based on the object bottom ratio, an estimate of a physical distance between the camera and the object. The distance projection model defines, for each respective candidate object bottom ratio of a plurality of candidate object bottom ratios, a mapping between (i) the respective candidate object bottom ratio and (ii) a corresponding physical distance in the environment. The method further includes generating an indication of the estimate of the physical distance between the camera and the object.

In a second example embodiment, a computing system is provided that includes a camera, a processor, and a non-transitory computer-readable storage medium having stored thereon instructions that, when executed by the processor, cause the processor to perform operation. The operations include receiving, from the camera, image data representing an object in an environment. The operations also include determining, based on the image data, a vertical position within the image data of a bottom of the object and determining an object bottom ratio between the vertical position and a height of the image data. The operations additionally include determining, by way of a distance projection model and based on the object bottom ratio, an estimate of a physical distance between the camera and the object. The distance projection model defines, for each respective candidate object bottom ratio of a plurality of candidate object bottom ratios, a mapping between (i) the respective candidate object bottom ratio and (ii) a corresponding physical distance in the environment. The operations further include generating an indication of the estimate of the physical distance between the camera and the object.

In a third example embodiment, a non-transitory computer-readable storage medium is provided having stored thereon instructions that, when executed by a computing system, cause the computing system to perform operations. The operations include receiving, from a camera, image data representing an object in an environment. The operations also include determining, based on the image data, a vertical position within the image data of a bottom of the object and determining an object bottom ratio between the vertical position and a height of the image data. The operations additionally include determining, by way of a distance projection model and based on the object bottom ratio, an estimate of a physical distance between the camera and the object. The distance projection model defines, for each respective candidate object bottom ratio of a plurality of candidate object bottom ratios, a mapping between (i) the respective candidate object bottom ratio and (ii) a corresponding physical distance in the environment. The operations further include generating an indication of the estimate of the physical distance between the camera and the object.

In a fourth example embodiment, a system is provided that includes means for receiving, from a camera, image data representing an object in an environment. The system also includes means for determining, based on the image data, a vertical position within the image data of a bottom of the object and means for determining an object bottom ratio between the vertical position and a height of the image data. The system additionally includes means for determining, by way of a distance projection model and based on the object bottom ratio, an estimate of a physical distance between the camera and the object. The distance projection model defines, for each respective candidate object bottom ratio of a plurality of candidate object bottom ratios, a mapping between (i) the respective candidate object bottom ratio and (ii) a corresponding physical distance in the environment. The system further includes means for generating an indication of the estimate of the physical distance between the camera and the object.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7 illustrates a flow chart, in accordance with example embodiments.

DETAILED DESCRIPTION

Figure 1:
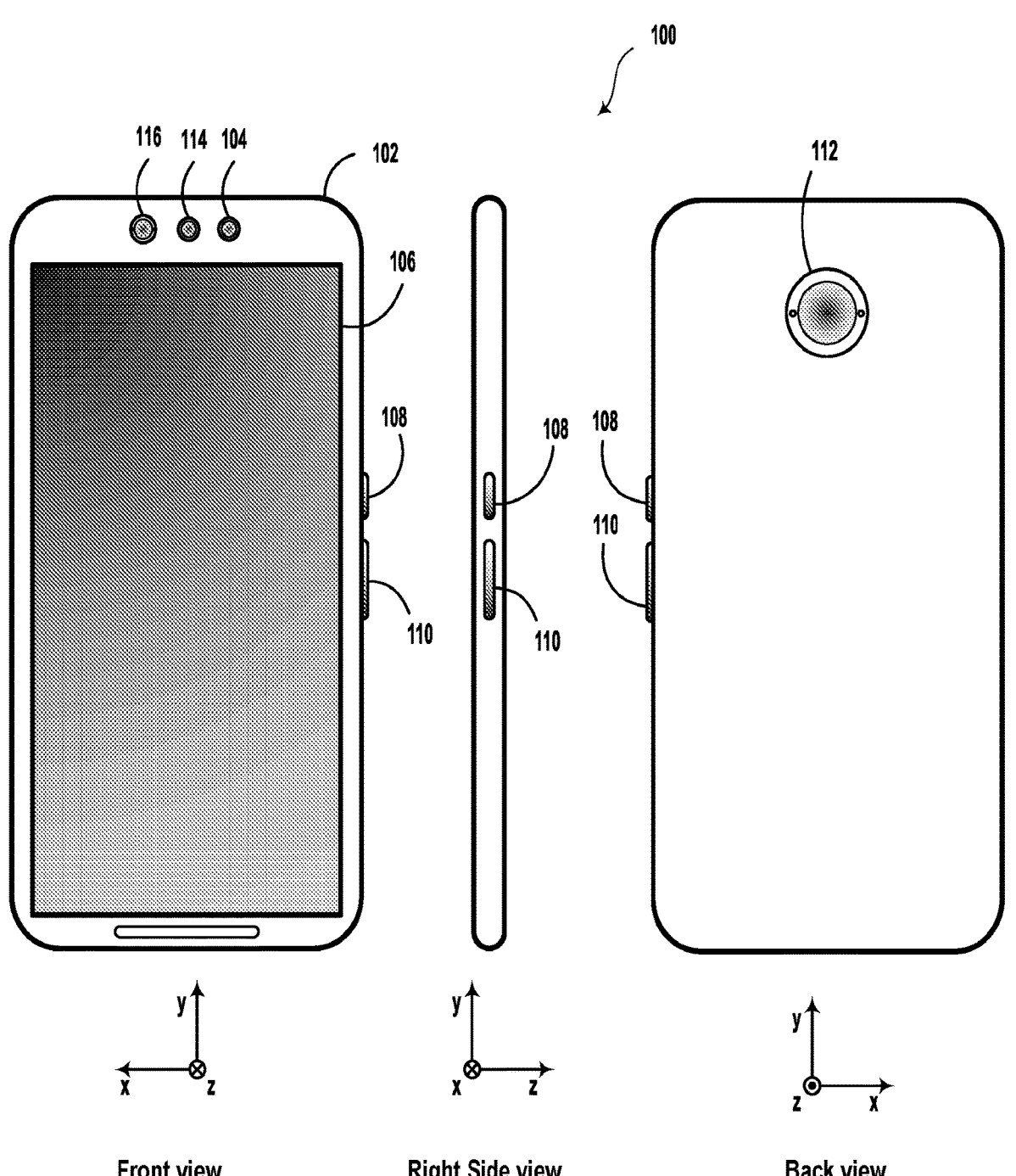
FIG. 1 illustrates a computing system, in accordance with example embodiments.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. OVERVIEW

Computing devices, including mobile and/or wearable computing devices, may include a camera that can be used to capture images of an environment. For example, the camera may face the environment in front of a user when the computing device is held, worn, and/or used by the user. Accordingly, provided herein are systems and operations that may be used to determine a distance between the camera and objects represented in image data generated by the camera. These systems and operations may, for example, be implemented on computing devices that include a camera, thus allowing these computing devices to measure the distance to objects within the environment.

The distance between the camera and an object may be determined by mapping a position of a bottom of the object, as represented in the image data generated by the camera, to a corresponding physical distance. This approach may provide a computationally-inexpensive way to calculate the depth of both moving and/or static objects of interest in real-time. Due to the relatively low computational complexity, these systems and operations may be implemented on lower-end devices and/or power-limited devices, including mobile phones and/or wearable devices (e.g., smart watches, dashboard cameras, etc.). Further, in some cases, the systems and operations may be used with respect to image data generated by a monoscopic camera that represents the environment from one viewpoint at a time. Thus, for example, the systems and operations may be used as an alternative to depth measurements based on stereoscopic image data generated by a stereoscopic camera and/or image data that includes a structured light pattern projected by a patterned light projector. In other cases, however, the systems and operations disclosed herein may be used in combination with other approaches for distance/depth measurement, such as stereoscopic imagery and/or structured light projection.

The process of depth measurement may assume that the camera is disposed at a known height above a ground surface within the environment. For example, the camera and/or the computing device that houses the camera may be coupled to a user at a particular position on the user's body, such as on the chest, arm, wrist, or waistline, and may thus remain at substantially the same height over time. The depth measurement process may be executed with respect to images captured by the camera to determine distances to various objects within the environment. The computing device may generate a visual, audible, haptic, and/or other representation of the distance. Thus, for example, the computing device may be used by visually-impaired users to navigate through an environment with the assistance of the depth measurement process executed by the computing device.

Specifically, with the camera at the known height, each point located at a particular distance on the ground surface of the environment may be associated with and expected to produce an image at a corresponding position on an image sensor of the camera. The relationship between the particular distance and its corresponding position on the image sensor may be represented by an empirically-determined (e.g., learned and/or trained) mapping, which may form part of a distance projection model. Since the mapping assumes the camera to be at the known height, a plurality of different mappings may be provided as part of the distance projection model, each associated with a different height, to allow for distance measurements as the height of the camera is changed.

In order to determine the distance between the camera and an object represented in an image captured by the camera, the computing device may be configured to identify a vertical position of a bottom of the object. The bottom of the object may be used because it is expected to be in contact with some point on the ground surface of the environment, and the mappings of the distance projection model relate image positions to distances of points on the ground surface. The vertical position of the bottom of the object may be divided by a height of the image to obtain an object bottom ratio, which represents the vertical position of the bottom of the object as a fraction of the image height (i.e., the object bottom ratio may range from 0 to 1). By encoding the vertical position as a ratio, rather than, for example, as an absolute number of pixels, the same mapping may be used as the image is downsampled or upsampled. That is, using the object bottom ratio allows the mappings to be resolution-invariant for a given image aspect ratio.

Based on the object bottom ratio, the distance projection model may determine an estimate of the physical distance to the object. Specifically, the distance projection model may select a particular mapping to be used based on an indication of a height at which the camera is positioned, an orientation of the camera (e.g., landscape vs portrait), an aspect ratio of the image, and/or one or more additional camera parameters. That is, each mapping provided by the distance projection model may be associated with a different corresponding set of camera parameters. Thus, each object bottom ratio may be mapped to a different distance depending on which mapping is used. When the actual camera parameters match the camera parameters assumed by the mapping, the distance estimate is likely to be accurate, but when these two sets of camera parameters differ, the distance estimate may be erroneous. The error in the estimated distance may be proportional to the difference between corresponding parameters of the two sets of camera parameters.

The selected mapping may be used to determine the estimate of the distance to the object by mapping the object bottom ratio to a corresponding physical distance. Notably, since in some cases the image may be generated by a monoscopic camera and without projection of structured light, specification of camera parameters such as height, image orientation, aspect ratio, and others may serve as a replacement for depth cues that would otherwise be provided by a pair of stereoscopic images or a structured light pattern.

Further, as the camera is tilted upwards, the position of the bottom of the object may appear to move lower in the image, and as the camera is tilted downwards, the position of the bottom of the object may appear to move higher in the image. This apparent displacement of the object bottom due to camera pitch may be compensated for by an offset calculator. Specifically, the offset calculator may determine an estimated offset, expressed in terms of an object bottom ratio, based on a product of a tangent of the camera pitch angle and an empirically-determined focal length of the camera. The estimated offset may then be added to the object bottom ratio, and this sum may be provided as input to the distance projection model. Adding the estimated offset may have the effect of shifting the vertical position of the object bottom back to a position in which the bottom would be if the camera were at a zero pitch angle.

II. EXAMPLE COMPUTING DEVICES

FIG. 1 illustrates an example form factor of computing system 100. Computing system 100 may be, for example, a mobile phone, a tablet computer, or a wearable computing device. However, other embodiments are possible. Computing system 100 may include various elements, such as body 102, display 106, and buttons 108 and 110. Computing system 100 may further include front-facing camera 104, rear-facing camera 112, front-facing infrared camera 114, and infrared pattern projector 116.

Front-facing camera 104 may be positioned on a side of body 102 typically facing a user while in operation (e.g., on the same side as display 106). Rear-facing camera 112 may be positioned on a side of body 102 opposite front-facing camera 104. Referring to the cameras as front and rear facing is arbitrary, and computing system 100 may include multiple cameras positioned on various sides of body 102. Front-facing camera 104 and rear-facing camera 112 may each be configured to capture images in the visible light spectrum.

Display 106 could represent a cathode ray tube (CRT) display, a light emitting diode (LED) display, a liquid crystal (LCD) display, a plasma display, an organic light emitting diode (OLED) display, or any other type of display known in the art. In some embodiments, display 106 may display a digital representation of the current image being captured by front-facing camera 104, rear-facing camera 112, and/or infrared camera 114, and/or an image that could be captured or was recently captured by one or more of these cameras. Thus, display 106 may serve as a viewfinder for the cameras. Display 106 may also support touchscreen functions that may be able to adjust the settings and/or configuration of any aspect of computing system 100.

Front-facing camera 104 may include an image sensor and associated optical elements such as lenses. Front-facing camera 104 may offer zoom capabilities or could have a fixed focal length. In other embodiments, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent a monoscopic, stereoscopic, or multiscopic camera. Rear-facing camera 112 and/or infrared camera 114 may be similarly or differently arranged. Additionally, one or more of front-facing camera 104, rear-facing camera 112, or infrared camera 114, may be an array of one or more cameras.

Either or both of front-facing camera 104 and rear-facing camera 112 may include or be associated with an illumination component that provides a light field in the visible light spectrum to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the embodiments herein.

Infrared pattern projector 116 may be configured to project an infrared structured light pattern onto the target object. In one example, infrared projector 116 may be configured to project a dot pattern and/or a flood pattern. Thus, infrared projector 116 may be used in combination with infrared camera 114 to determine a plurality of depth values corresponding to different physical features of the target object.

Namely, infrared projector 116 may project a known and/or predetermined dot pattern onto the target object, and infrared camera 114 may capture an infrared image of the target object that includes the projected dot pattern. Computing system 100 may then determine a correspondence between a region in the captured infrared image and a particular part of the projected dot pattern. Given a position of infrared projector 116, a position of infrared camera 114, and the location of the region corresponding to the particular part of the projected dot pattern within the captured infrared image, computing system 100 may then use triangulation to estimate a depth to a surface of the target object. By repeating this for different regions corresponding to different parts of the projected dot pattern, computing system 100 may estimate the depth of various physical features or portions of the target object. In this way, computing system 100 may be used to generate a three-dimensional (3D) model of the target object.

Computing system 100 may also include an ambient light sensor that may continuously or from time to time determine the ambient brightness of a scene (e.g., in terms of visible and/or infrared light) that cameras 104, 112, and/or 114 can capture. In some implementations, the ambient light sensor can be used to adjust the display brightness of display 106. Additionally, the ambient light sensor may be used to determine an exposure length of one or more of cameras 104, 112, or 114, or to help in this determination.

Computing system 100 could be configured to use display 106 and front-facing camera 104, rear-facing camera 112, and/or front-facing infrared camera 114 to capture images of a target object. The captured images could be a plurality of still images or a video stream. The image capture could be triggered by activating button 108, pressing a softkey on display 106, or by some other mechanism. Depending upon the implementation, the images could be captured automatically at a specific time interval, for example, upon pressing button 108, upon appropriate lighting conditions of the target object, upon moving digital camera device 100 a predetermined distance, or according to a predetermined capture schedule.

As noted above, the functions of computing system 100 may be integrated into a computing device, such as a wireless computing device, cell phone, tablet computer, laptop computer and so on. For purposes of example, FIG. 2 is a simplified block diagram showing some of the components of an example computing device 200 that may include camera components 224.

By way of example and without limitation, computing device 200 may be a cellular mobile telephone (e.g., a smartphone), a still camera, a video camera, a computer (such as a desktop, notebook, tablet, or handheld computer), personal digital assistant (PDA), a home automation component, a digital video recorder (DVR), a digital television, a remote control, a wearable computing device, a gaming console, a robotic device, or some other type of device equipped with at least some image capture and/or image processing capabilities. It should be understood that computing device 200 may represent a physical image processing system, a particular physical hardware platform on which an image sensing and processing application operates in software, or other combinations of hardware and software that are configured to carry out image capture and/or processing functions.

Figure 2:
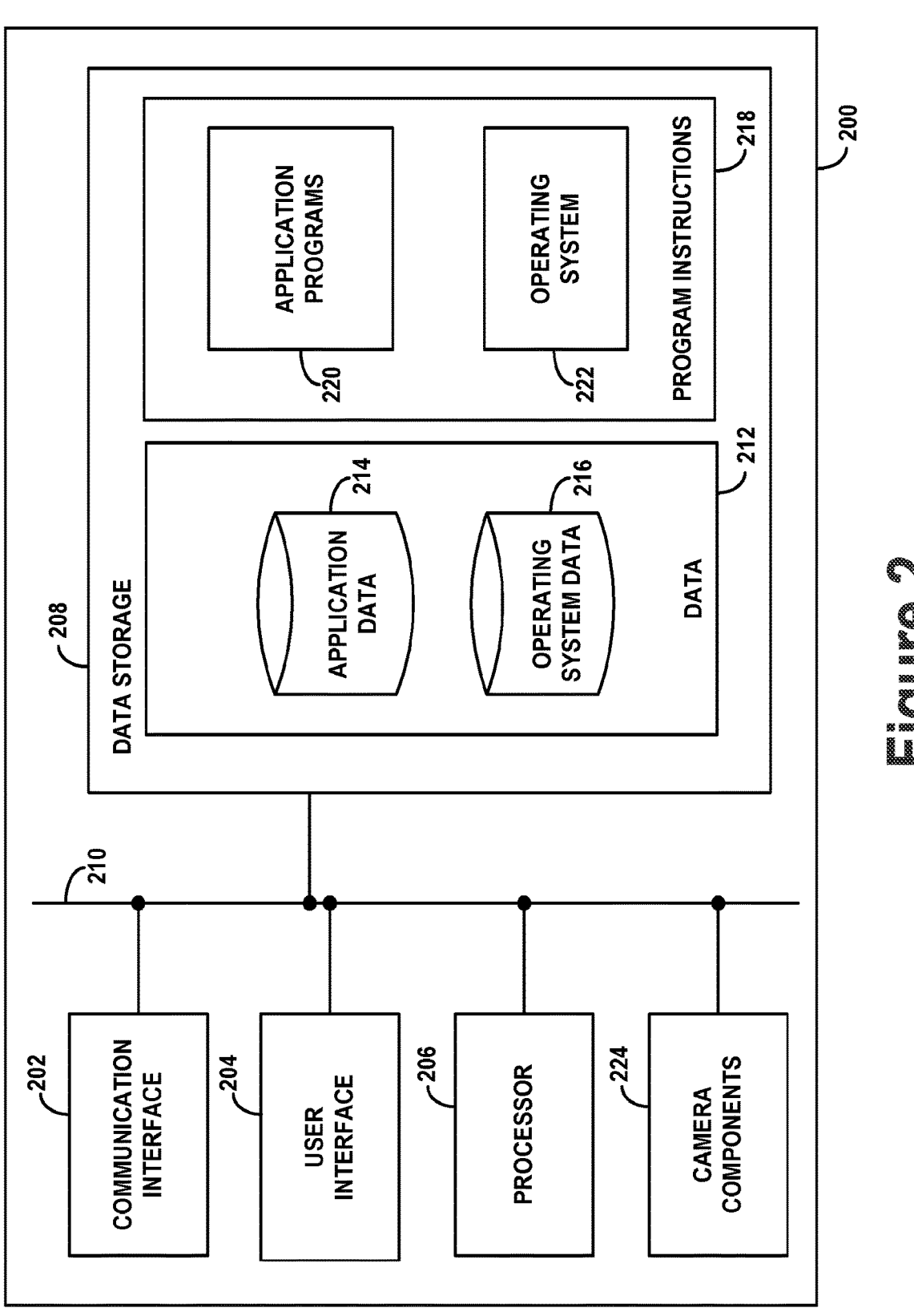
FIG. 2 illustrates a computing device, in accordance with example embodiments.

As shown in FIG. 2, computing device 200 may include communication interface 202, user interface 204, processor 206, data storage 208, and camera components 224, all of which may be communicatively linked together by a system bus, network, or other connection mechanism 210.

Communication interface 202 may allow computing device 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wi-Fi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wi-Fi interface, a BLUETOOTH® interface, and a wide-area wireless interface).

User interface 204 may function to allow computing device 200 to interact with a human or non-human user, such as to receive input from a user and to provide output to the user. Thus, user interface 204 may include input components such as a keypad, keyboard, touch-sensitive panel, computer mouse, trackball, joystick, microphone, and so on. User interface 204 may also include one or more output components such as a display screen which, for example, may be combined with a touch-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices. User interface 204 may also be configured to receive and/or capture audible utterance(s), noise(s), and/or signal(s) by way of a microphone and/or other similar devices.

In some embodiments, user interface 204 may include a display that serves as a viewfinder for still camera and/or video camera functions supported by computing device 200 (e.g., in both the visible and infrared spectrum). Additionally, user interface 204 may include one or more buttons, switches, knobs, and/or dials that facilitate the configuration and focusing of a camera function and the capturing of images. It may be possible that some or all of these buttons, switches, knobs, and/or dials are implemented by way of a touch-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing device 200, cause computing device 200 to carry out any of the methods, processes, or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, audio-to-text functions, text translation functions, and/or gaming applications) installed on computing device 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing device 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some vernaculars, application programs 220 may be referred to as "apps" for short. Additionally, application programs 220 may be downloadable to computing device 200 through one or more online application stores or application markets. However, application programs can also be installed on computing device 200 in other ways, such as via a web browser or through a physical interface (e.g., a USB port) on computing device 200.

Camera components 224 may include, but are not limited to, an aperture, shutter, recording surface (e.g., photographic film and/or an image sensor), lens, shutter button, infrared projectors, and/or visible-light projectors. Camera components 224 may include components configured for capturing of images in the visible-light spectrum (e.g., electromagnetic radiation having a wavelength of 380-700 nanometers) and components configured for capturing of images in the infrared light spectrum (e.g., electromagnetic radiation having a wavelength of 701 nanometers-1 millimeter). Camera components 224 may be controlled at least in part by software executed by processor 206.

III. EXAMPLE DEPTH DETERMINATION SYSTEM

Figure 3:
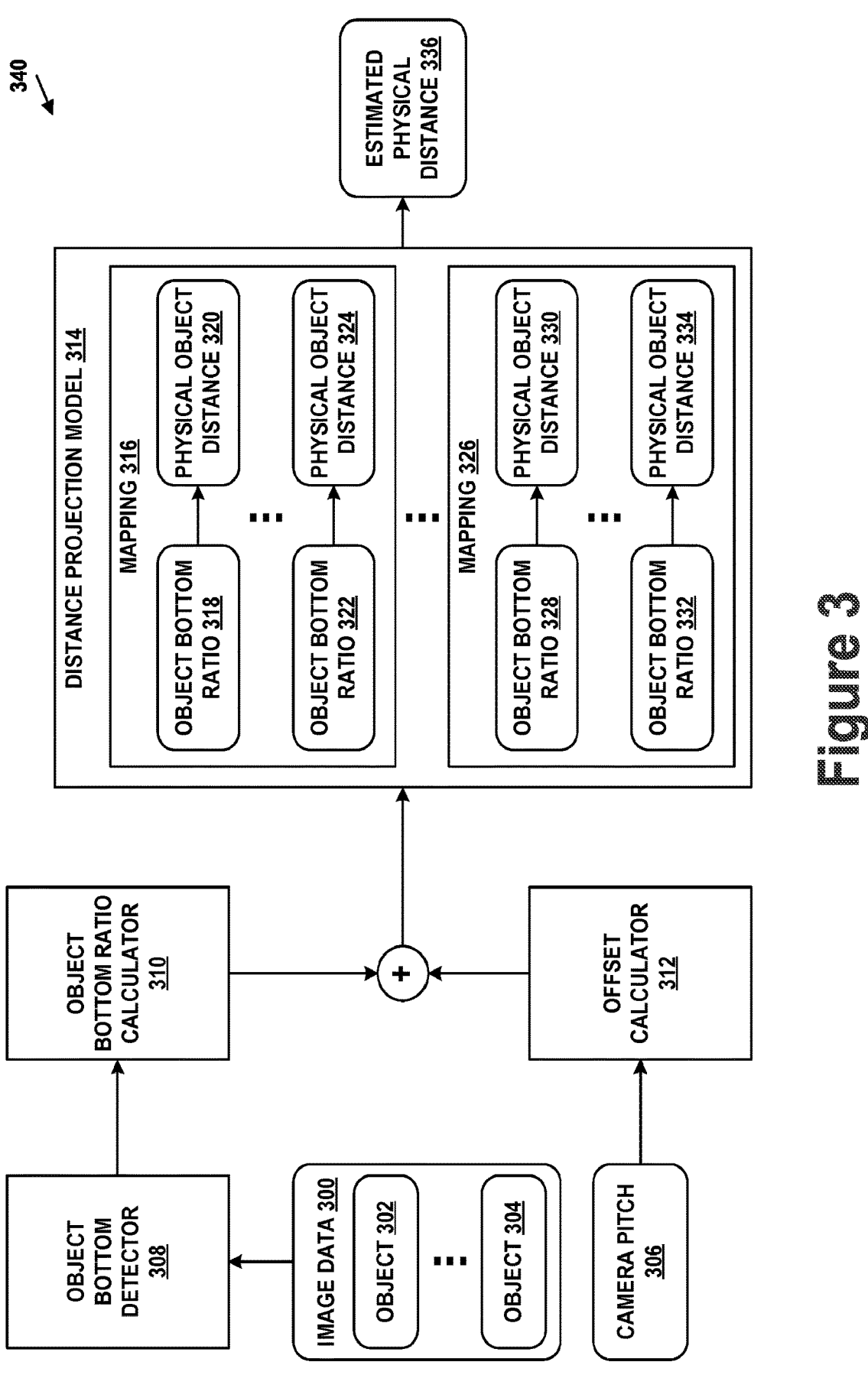
FIG. 3 illustrates a system for estimating object distance, in accordance with example embodiments.

FIG. 3 illustrates an example system that can be used to determine an estimate of a physical distance between a camera and one or more objects within an environment. Specifically, system 340 may include object bottom detector 308, object bottom ratio calculator 310, offset calculator 312, and distance projection model 314, each of which may represent a combination of hardware components and/or software components configured to carry out the respective operations described herein. System 340 may be configured to receive as input image data 300 and metadata indicative of parameters of the camera. The metadata may include information regarding a pose of the camera, such as camera pitch 306, at a time of capture of image data 300. Image data 300 may represent therein one or more objects, such as objects 302-304. Objects 302-304 may include various moving and/or stationary features of the environment, such as humans, animals, vehicles, robotic devices, mailboxes, posts (e.g., lamp posts, traffic light posts, etc.), and/or benches, among other possibilities.

Object bottom detector 308 may be configured to detect a vertical position of a bottom of an object within image data 300. In some implementations, the vertical position may be expressed in pixels. For example, object bottom detector 308 may determine that a bottom of object 302 is positioned 250 pixels above a bottom of image data 300. Object bottom detector 308 may implement one or more algorithms configured to (i) detect object 302 within image data 300, (ii) detect the bottom of object 302 within image data 300 based on detection of object 302 within image data 300, and (iii) determine that the bottom of object 302 is positioned on a ground surface of the environment. Object bottom detector 308 may perform commensurate operations with respect to object 304 and/or any other objects represented by image data 300.

In cases where object 302 is a human, the one or more algorithms of object bottom detector 308 may be configured to detect a human, detect the feet and/or shoes of the human (i.e., the bottom of the human within image data 300), and determine that the feet and/or shoes are in contact with the ground. Similarly, when object 304 is a vehicle, the one or more algorithms of object bottom detector 308 may be configured to detect a vehicle, detect the wheels and/or tires of the vehicle, and determine that the wheels and/or tires are in contact with the ground. The one or more algorithms may include various image processing algorithms, computer vision algorithms, and/or machine learning algorithms.

Object bottom detector 308 may be configured to provide the vertical position of the bottom of the object to object bottom ratio calculator 310. Object bottom ratio calculator 310 may be configured to calculate a ratio between the vertical position of the bottom of the object (e.g., object 302) and a height of image data 300. Specifically, object bottom ratio calculator may implement the function $b=v/h$, where b is the object bottom ratio, v is the vertical position of the bottom of the object, and h is the height of image data 300. To that end, object bottom ratio calculator 310 may determine, based on metadata associated with image data 300, an orientation of image data 300. Specifically, object bottom ratio calculator 310 may determine whether image data 300 has been taken in a landscape orientation (i.e., with the longer side of image data 300 oriented horizontally) or a portrait orientation (i.e., with the longer side of image data 300 oriented vertically). Object bottom ratio calculator may thus set the value of h based on the orientation of image data 300. For example, for image data 300 having a resolution of 3840 pixels by 2160 pixels, the height h of image data 300 may be set to 3480 pixels based on determining that image data 300 is a portrait image, or to 2160 based on determining that image data 300 is a landscape image.

Distance projection model 314 may be configured to determine estimated physical distance 336 between the object (e.g., object 302) represented in image data 300 and the camera that generated image data 300. Specifically, distance projection model 314 may determine estimated physical distance 336 based on a sum of the object bottom ratio calculated by object bottom ratio calculator and an estimated offset to the object bottom ratio calculated by offset calculator 312 to account for camera pitch 306.

Offset calculator 312 may be configured to determine, based on camera pitch 306, an amount or offset by which the object bottom ratio is to be shifted/adjusted to account for a non-zero camera pitch angle. Specifically, distance projection model 314 may be implemented with the assumption that image data 300 has been captured while the optical axis of the camera was oriented substantially parallel to a ground surface in the environment. As the camera is tilted up to a positive pitch angle, the object bottom ratio calculated by object bottom ratio calculator 310 decreases relative to what the object bottom ratio would have been at a zero pitch angle. Similarly, as the camera is tilted down to a negative pitch angle, the object bottom ratio calculated by object bottom ratio calculator 310 increases relative to what the object bottom ratio would have been at a zero pitch angle. Thus, without offset calculator 312, estimated physical distance 336 might be an underestimate at positive pitch angles and an overestimate at negative pitch angles, as shown in and explained with respect to FIGS. 4E and 4F.

Offset calculator 312 may thus allow distance projection model 314 to generate accurate distance estimates by correcting for camera pitch 306. The correction process is illustrated in and discussed in more detail with respect to FIG. 5. The object bottom ratio determined by object bottom ratio calculator 310 and the estimated offset calculated by offset calculator 312 may be added, and this sum may be provided as input to distance projection model 314.

Distance projection model 314 may include a plurality of mapping 316-326, and may determine estimated physical distance 336 by way of one or more of mappings 316-326. Each of mappings 316-326 may associate a plurality of object bottom ratios with a plurality of corresponding physical object distances. For example, mapping 316 may associate object bottom ratios 318-322 with corresponding physical object distances 320-324. Similarly, mapping 326 may associate object bottom ratios 328-332 with corresponding physical object distances 330-334. Object bottom ratios associated with mappings 316-326 (e.g., object bottom ratios 318-322 and 238-332) may be referred to as candidate object bottom ratios since each could potentially be used to determine estimated physical distance 336.

Each of mappings 316-326 may be associated with a corresponding set of camera parameters, which may include, for example, an orientation of image data 300 (i.e., landscape or portrait), a height in the environment at which the camera is disposed when capturing image data 300, a field of view of the camera used to capture image data 300 (e.g., as defined by dimensions of the camera's image sensor and optical properties of the camera's lenses), and/or an aspect ratio of image data 300, among other possibilities. Thus, one of mappings 316-326 may be selected and used to determine estimated physical distance 336 based on the values of the camera parameters associated with image data 300, which may be indicated as part of the metadata associated with image data 300. Accordingly, object bottom ratios 318-322 may be similar to, overlap with, or be identical to object bottom ratios 328-332, but object bottom ratios 318-322 may map to a different set of physical object distances than object bottom ratios 328-332. That is, physical object distances 320-324 may differ from physical object distances 330-334, although these two sets may overlap.

IV. EXAMPLE MODELS FOR DEPTH DETERMINATION

Figure 4A:
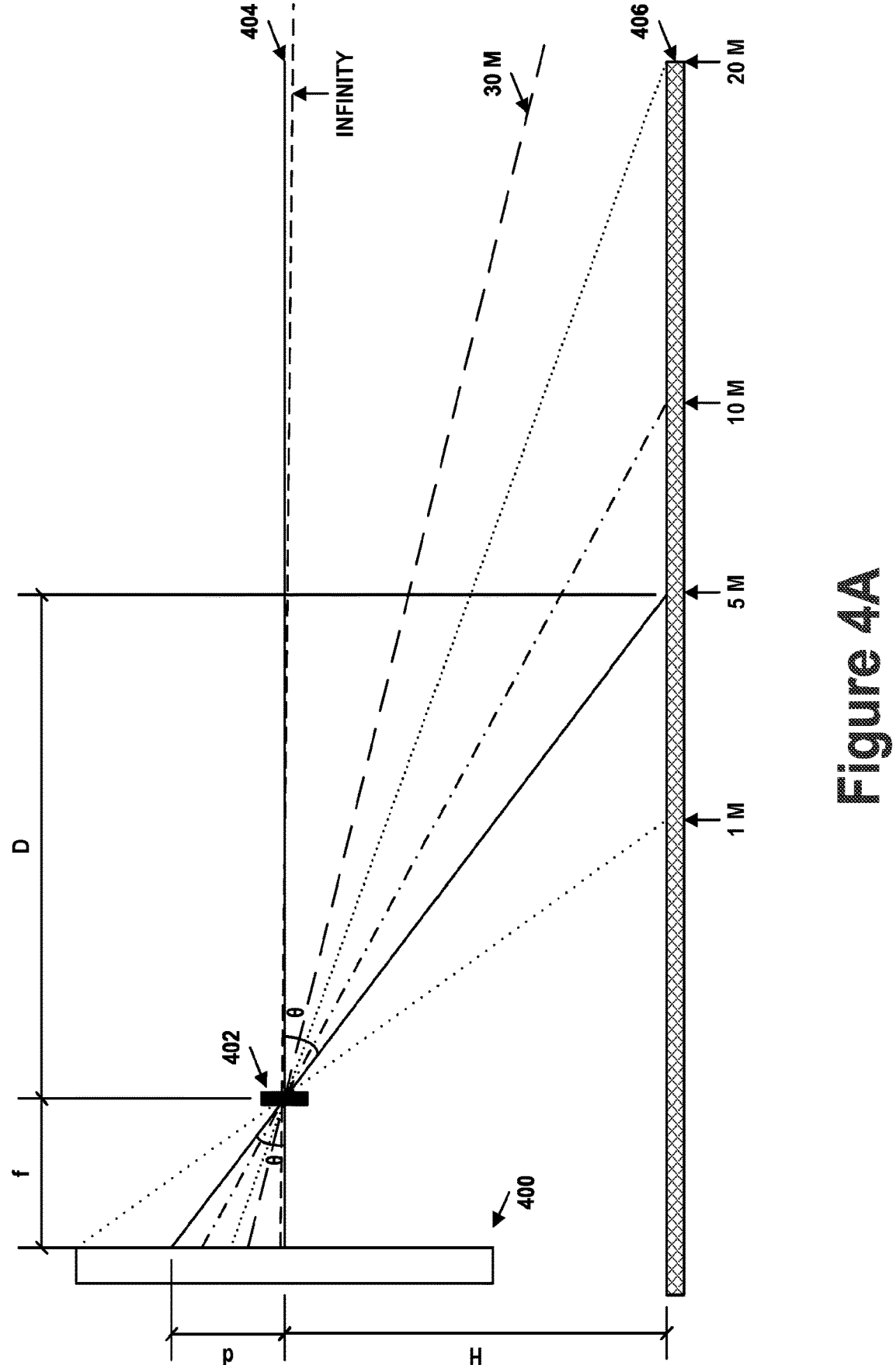
FIG. 4A illustrates an optical model, in accordance with example embodiments.

FIG. 4A illustrates an example geometric model of a camera. The geometric model may be used as a basis for generating mappings 316-326 of distance projection model 314. Specifically, FIG. 4A illustrates image sensor 400 and aperture 402 disposed in an environment that includes a ground surface 406. Image sensor 400 and aperture 402 define optical axis 404 that, in FIG. 4A, runs substantially parallel to ground surface 406. Image sensor 400 (i.e., the vertical center thereof) is disposed at a height H above ground surface 406 and aperture 402 is positioned at a (focal) distance f relative to image sensor 400.

A plurality of lines are projected from respective points on ground surface 406 in the environment, through aperture

402, to corresponding points on image sensor 400. Specifically, the plurality of lines include a 1 meter line, a 5 meter line, a 10 meter line, a 20 meter line, a 30 meter line, and an infinity reference line. The 5 meter line (i.e., D=5 meters), for example, corresponds to and creates an image at vertical position d relative to a center of image sensor 400, and forms an angle θ with optical axis 404. The 1 meter line corresponds to a minimum distance between aperture 402 and an object that may be observable and/or measurable, since this line projects to a topmost portion of image sensor 400.

The infinity reference line may correspond to a maximum observable distance in the environment, a distance to the horizon, a distance that exceeds a threshold distance value, and/or an infinite distance. For example, the infinity reference line may be associated with an infinite distance when the infinity reference line originates above the ground surface 406, and is therefore not associated with a measurable distance along the ground surface 406. The infinity reference line is shown in FIG. 4A as approximately coinciding with optical axis 404. The right part of the infinity reference line is drawn as falling slightly below optical axis 404 and the left side of the infinity reference line is drawn as falling slightly above optical axis 404 to visually distinguish the infinity reference line from optical axis 404. Thus, in the configuration shown in FIG. 4A, the infinity reference line corresponds to and creates an image at approximately the center of image sensor 400. As the height H of image sensor 400 is increased (e.g., when the camera is mounted on an aerial vehicle) from that shown in FIG. 4A, the image created by the infinity reference line may shift up along image sensor 400. Similarly, as the height H of image sensor 400 is decreased (e.g., when the camera is mounted on a floor cleaning robot) from that shown in FIG. 4A, the image created by the infinity reference line may shift down along image sensor 400. Thus, the infinity reference line may deviate from optical axis 404 as the height H changes. The respective positions on image sensor 400 of images corresponding the 1 meter line, the 5 meter line, the 10 meter line, the 20 meter line, and/or the 30 meter line may respond similarly to changes in the height H of image sensor 400.

The example geometric model of FIG. 4A omits some components of the camera, such as lenses, that may be used to generate the image data used for depth determination. Thus, this example geometric model might not be an accurate representation of some cameras, and using the geometric model explicitly to compute object distances may result in erroneous distance estimates. Nevertheless, the geometric model illustrates that there is a non-linear relationship (e.g., $\tan(\theta)=d/f=H/D$, or $d=Hf/D$) between vertical positions on image sensor 400 and corresponding physical distances along ground surface 406 within the environment. Thus, a non-linear numerical model (e.g., distance projection model 314) may be determined empirically, on the basis of training data, to correct for any inaccuracies of the geometric model of FIG. 4A and accurately map positions on image sensor 400 to corresponding physical distances along ground surface 406.

Further, the geometric model of FIG. 4A illustrates that changes in some camera parameters, including the height H of the camera (e.g., the height of image sensor 400 and/or aperture 402), the distance f, the angle θ, the field of view of the camera (defined by the size of image sensor 400, the lenses used to focus light on image sensor 400, and/or the zoom level generated by the lenses), the portion of image sensor 400 from which image data is generated (e.g., the aspect ratio of the image data), and/or the orientation of image sensor 400 (e.g., landscape vs. portrait) may change the relationship (e.g., mapping) between the physical distances along ground surface 406 and positions on image sensor 400. Accordingly, these camera parameters may be accounted for by the non-linear numerical model in order to generate accurate distance estimates.

Specifically, each of mappings 316-326 may correspond to a particular set of camera parameters and may generate distance estimates that are accurate for a camera having the particular set of camera parameters, but that might be inaccurate when a different camera having a different set of camera parameters is used. Thus, one of mappings 316-326 may be selected based on the set of actual camera parameters associated with the camera used to generate image data 300. Specifically, a mapping associated with camera parameters that most closely match the set of actual camera parameters may be selected.

For example, a first mapping of mappings 316-326 may be associated with a first set of camera parameters corresponding to a first mobile device equipped with a first camera, while a second mapping of mappings 316-326 may be associated with a second set of camera parameters corresponding to a second mobile device equipped with a second camera different from the first camera. Thus, the first mapping may be used to measure distances to objects represented in image data generated by the first mobile device, while the second mapping may be used to measure distances to objects represented in image data generated by the second mobile device. In cases where multiple different mobile devices each use a camera having similar or substantially the same set of camera parameters, one mapping may be used by the multiple different mobile devices. Additionally, since each camera may be positioned at a plurality of different heights H, each camera may be associated with a plurality of mappings each corresponding to a different height.

Figure 4B:
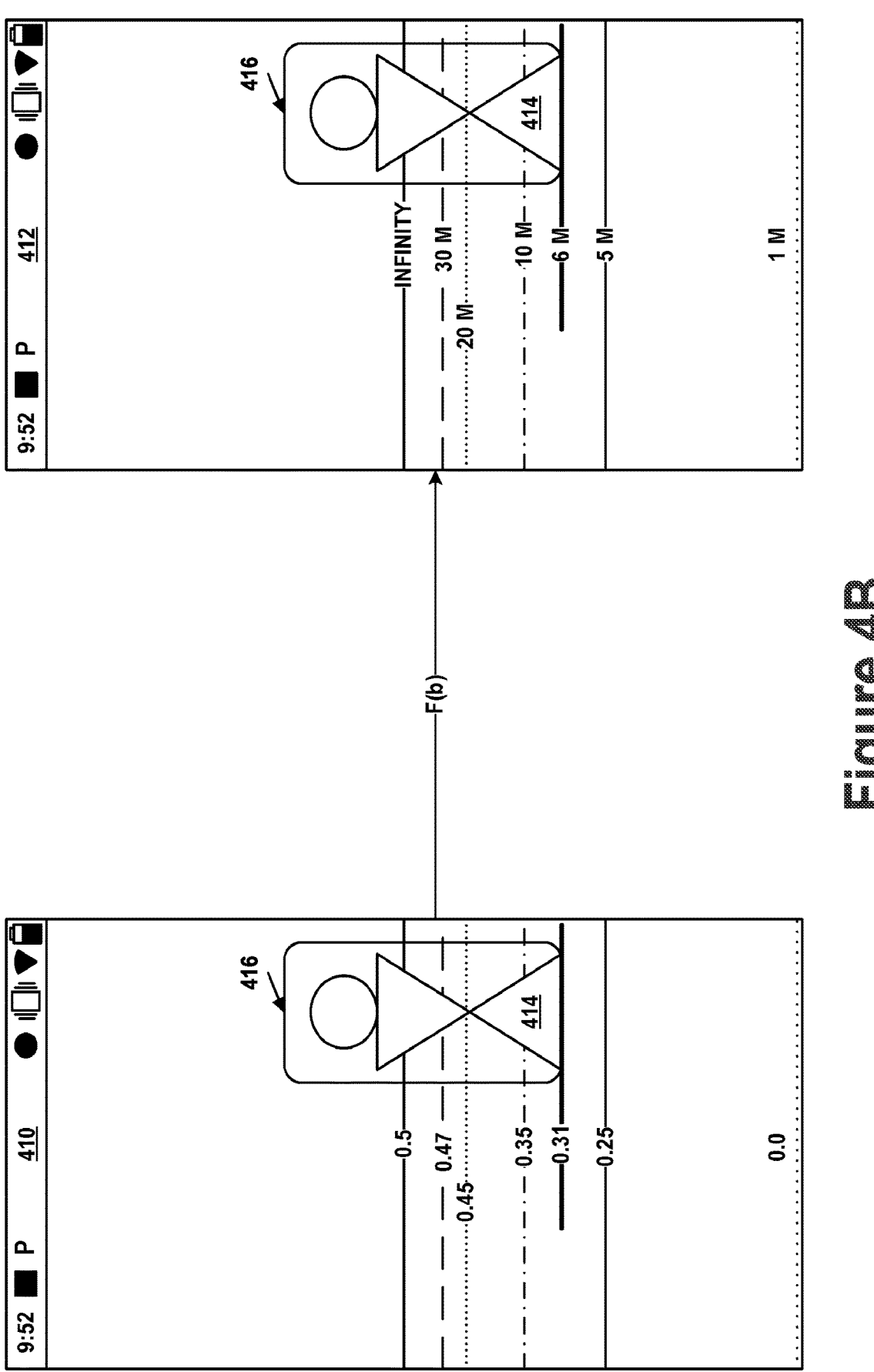
FIG. 4B illustrates a mapping between object bottom ratios and physical distances, in accordance with example embodiments.

FIG. 4B illustrates a graphical representation of an example mapping between object bottom ratios and physical distances. The mapping, rather than expressing vertical positions on image sensor 400 in terms of pixels, may express the vertical positions in terms of corresponding object bottom ratios. This allows the mapping to remain invariant to image data resolution. Thus, such a mapping may be used to determine object distance as the image data is downsampled or upsampled since the object bottom ratio associated with the object does not change (assuming the image is not cropped and/or the aspect ratio remains the same).

Specifically, user interface (UI) 410 illustrates a plurality of horizontal lines corresponding to respective object bottom ratios, including 0.0, 0.25, 0.35, 0.45, 0.47, and 0.5. Notably, the horizontal line associated with an object bottom ratio of 0.5 is positioned in approximately the middle of UI 410, dividing UI 410 into approximately equal top and bottom halves. UI 412 illustrates the same plurality of lines as UI 410 labeled with corresponding physical distances, including 1 meter, 5 meters, 10 meters, 20 meters, 30 meters, and infinity. That is, the object bottom ratios 0.0, 0.25, 0.35, 0.45, 0.47, and 0.5 correspond to physical distances of 1 meter, 5 meters, 10 meters, 20 meters, 30 meters, and a distance associated with the infinity reference line of FIG. 4A (e.g., infinity), respectively. The object bottom ratios may be mapped to the corresponding distances by a function F (b), which may represent one of mappings 316-326 of distance projection model 314.

UIs 410 and 412 also display image data that includes object 414, which may represent a human. Bounding box 416 surrounds object 414. Bounding box 416 may represent an output of a first algorithm implemented by object bottom detector 308 and may be used to define a search region for a second algorithm implemented by object bottom detector 308. For example, bounding box 416 may define a region of interest that has been determined by the first algorithm to contain a representation of a human. Bounding box 416 may be provided as input to the second algorithm configured to identify the feet and/or shoes of the human in an attempt to identify the bottom thereof. Thus, bounding box 416 may reduce the search space considered by the second algorithm when looking for the object bottom. Additionally, when bounding box 416 is associated with an object label or classification (e.g., human, vehicle, animal, etc.) the label may be used to select an appropriate algorithm for locating the bottom of objects associated with that label. For example, when bounding box 416 is classified as containing a representation of a car, an algorithm that looks for car wheels and/or tires may be selected to search for the object bottom, rather than an algorithm that looks for human feet and/or shoes.

UIs 410 and 412 further illustrate a line that corresponds to the bottom of object 414. In UI 410, this line is labeled with an object bottom ratio of 0.31 (indicating that the bottom of object 414 is positioned slightly below ¼ of the way up from the bottom of UI 410), while in UI 412 it is labeled with a distance of 6 meters. The object bottom ratio of 0.31 and, in some cases, the line corresponding thereto, may represent the output of object bottom ratio calculator 310 and/or offset calculator 312. The object bottom ratio of 0.31 may be mapped to the corresponding physical distance of 6 meters by way of function F(b).

F(b) may be determined based on empirical training data. For example, a plurality of physical distances may be measured relative to a camera and visually marked within an environment. The camera may be used to capture training image data that represents these visually-marked distances. While capturing the training image data, the camera may be disposed at a predetermined height within the environment. Thus, the function or mapping trained based on this training image data may be valid for measuring distances (i) using the same camera or another camera having a similar or substantially the same set of camera parameters and (ii) positioned at a similar or substantially the same predetermined height. Additional functions or mappings may be determined using a similar procedure based on training data obtained using a camera having a different set of camera parameters and/or the same camera positioned at different heights.

In one example, the function F(b) may be formulated as a polynomial model, $F(b)=a_0+a_1b^1+a_2b^2+a_3b^3+\ldots+a_nb_n$, where b represents the object bottom ratio and $a_0$-$a_n$ represent empirically-determined coefficients. Based on the training data, a plurality of object bottom ratios $B_{training}=[b_0=0.0, b_1=0.01, \ldots, b_r=0.5]$ associated with the plurality of physical distances $D_{training}=[d_0=0.5 \text{ m}, d_1=1.0 \text{ m}, \ldots, d_r=20.0 \text{ m}]$ may be used to determine the coefficients $a_0$-$a_n$, where $A=[a_0, a_1, \ldots, a_n]$. Specifically, $a_0$-$a_n$ may be computed by solving the equation $AB_{training}'=D_{training}$ for A, where $B_{training}'$ is equal to $$\begin{bmatrix} b_0^0 & b_1^0 & \ldots & b_r^0 \\ b_0^1 & b_1^1 & \ldots & b_r^1 \\ \vdots & \vdots & \vdots & \vdots \\ b_0^n & b_1^n & \ldots & b_r^n \end{bmatrix}.$$

Thus, $AB_{training}'=D_{training}$ may be rewritten as $$[a_0, a_1, \ldots, a_n] \begin{bmatrix} b_0^0 & b_1^0 & \ldots & b_t^0 \\ b_0^1 & b_1^1 & \ldots & b_t^1 \\ \vdots & \vdots & \vdots & \vdots \\ b_0^n & b_1^n & \ldots & b_t^n \end{bmatrix} = [d_0, d_1, \ldots, d_t].$$

Once the coefficients $a_0$-$a_n$ are determined based on the training data, the function F(b) may be used to determine a physical distance between the camera and an object on the basis of an object bottom ratio associated with the object. Specifically, $AB_{observed}=D_{estimated}$, where $$B_{observed} = \begin{bmatrix} 1 \\ b_{observed}^1 \\ b_{observed}^2 \\ \vdots \\ b_{observed}^n \end{bmatrix},$$

and $D_{estimated}$ is a scalar value corresponding to estimated physical distance 336.

In other examples, the function F(b) may be implemented as an artificial intelligence (AI) and/or machine learning (ML) model. For example, an artificial neural network (ANN) may be used to implement the mappings between object bottom ratios and physical distances. In some implementations, each set of camera parameters may be associated with a corresponding ANN. That is, each of mappings 316-326 may represent a separate ANN trained using image data captured by a camera with a corresponding set of camera parameters. In other implementations, a single ANN may simultaneously implement each of mappings 316-326. To that end, this ANN may be configured to receive as input at least a subset of the camera parameters, which may adjust how the ANN maps the input object bottom ratios to corresponding physical distances. Thus, the ANN may be configured to map each candidate object bottom ratio to a plurality of physical distances, and the specific physical distance for a particular object bottom ratio may be selected by the ANN based on the values of the camera parameters.

Notably, distance projection model 314 may be configured to determine the distance associated with an object on the basis of one visible-light spectrum image captured using a monoscopic camera and without relying on structured light. That is, the distance may be determined without using stereoscopic image data, or projecting a predetermined pattern onto the environment. Instead, in order to accurately determine distances to objects, distance projection model 314 and/or offset calculator 312 may estimate the object distance on the basis of camera parameters that, among other aspects of the camera, define the pose of the camera relative to the environment and/or the optical characteristics of the camera. As the pose of the camera is changed and/or a different camera is used, the camera parameters may be updated so that distance projection model 314 and/or offset calculator 312 may compensate for this difference by, for example, using an appropriate mapping. In some cases, however, system 340 may be used in combination with other depth determination methods that rely on stereoscopic image data and/or structured light projection.

V. EXAMPLE MODEL ERRORS AND ERROR CORRECTIONS

Figure 4C:
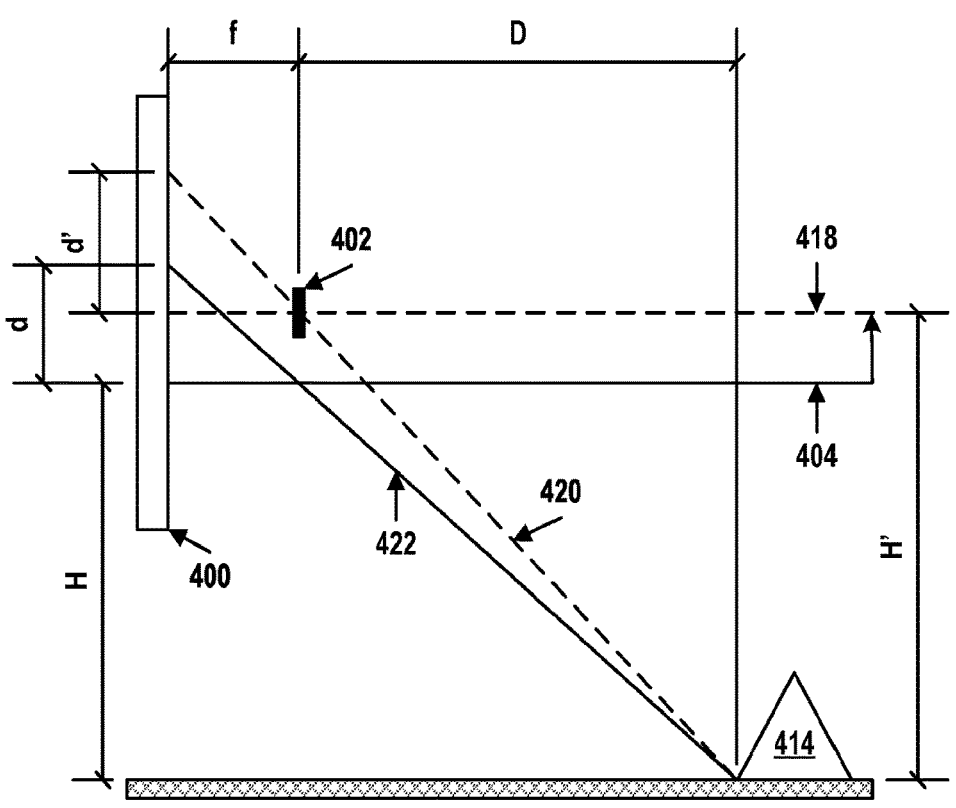
FIGS. 4C, 4D, 4E, and 4F illustrates various model errors, in accordance with example embodiments.
Figure 4C:
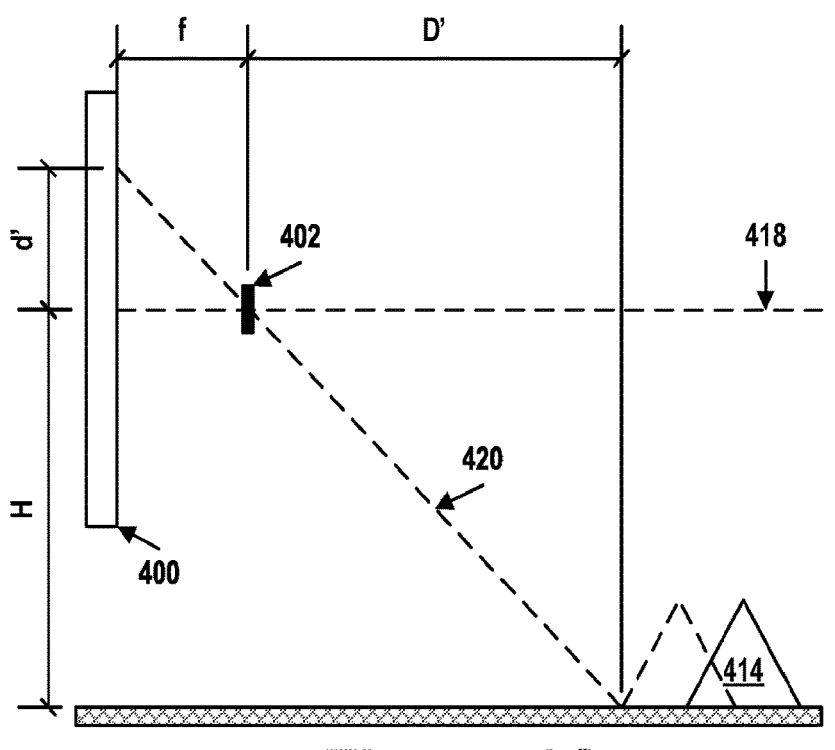

FIGS. 4C, 4D, 4E, and 4F illustrate errors that may occur when actual camera parameters deviate from the camera parameters assumed or used by distance projection model 314. Specifically, top portion of FIG. 4C illustrates image sensor 400 shifted upwards from height H to height H', resulting in optical axis 404 moving upwards by a proportional amount, as indicated by line 418. Without this upward shift, the bottom portion of object 414 closest to image sensor 400 would create an image on image sensor 400 at a distance d above the center thereof, as indicated by line 422. However, the upwards shift results in the image instead being created at distance d' (which is larger than d) above the center of image sensor 400, as indicated by line 420.

If the mapping used to calculate the distance D between aperture 402 and object 414 corresponds to height H rather than height H', the mapping may erroneously determine that object 414 is positioned at distance D', as illustrated in the bottom portion of FIG. 4C, rather than distance D. Specifically, the bottom portion of FIG. 4C illustrates image sensor 400 shifted back down such that line 418 coincides with optical axis 404 and line 420 runs from the same point on image sensor 400 to distance D', rather than distance D, on the ground surface. Distance D' is shorter than distance D, resulting in the distance estimate being an underestimate. This error may be reduced, minimized, or avoided by using a mapping that corresponds to a camera height of H' rather than H.

Figure 4D:
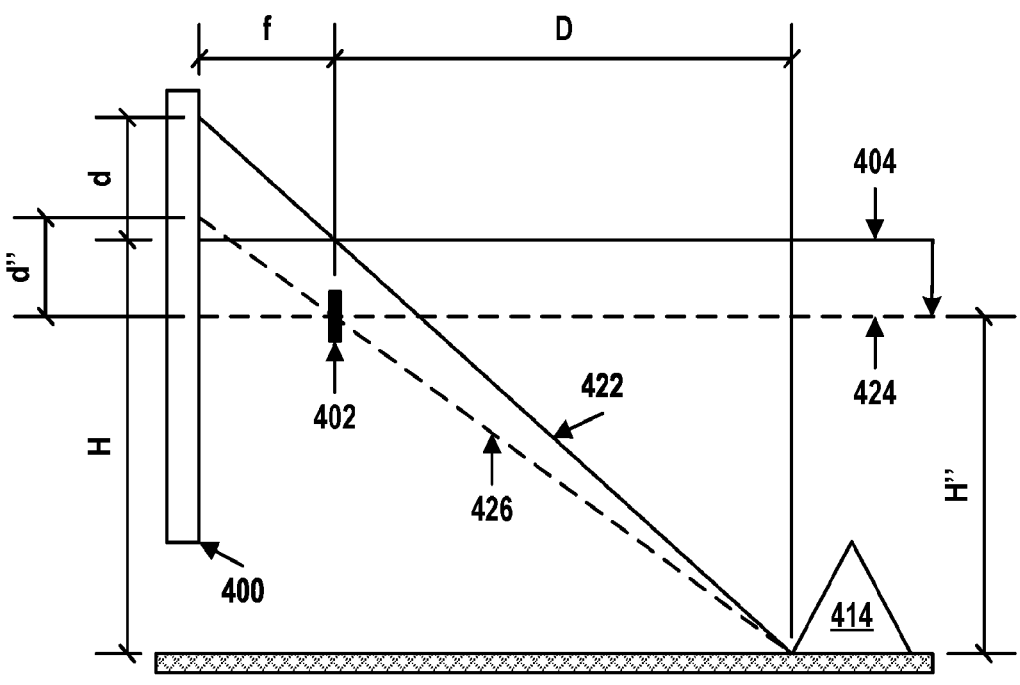
Figure 4D:
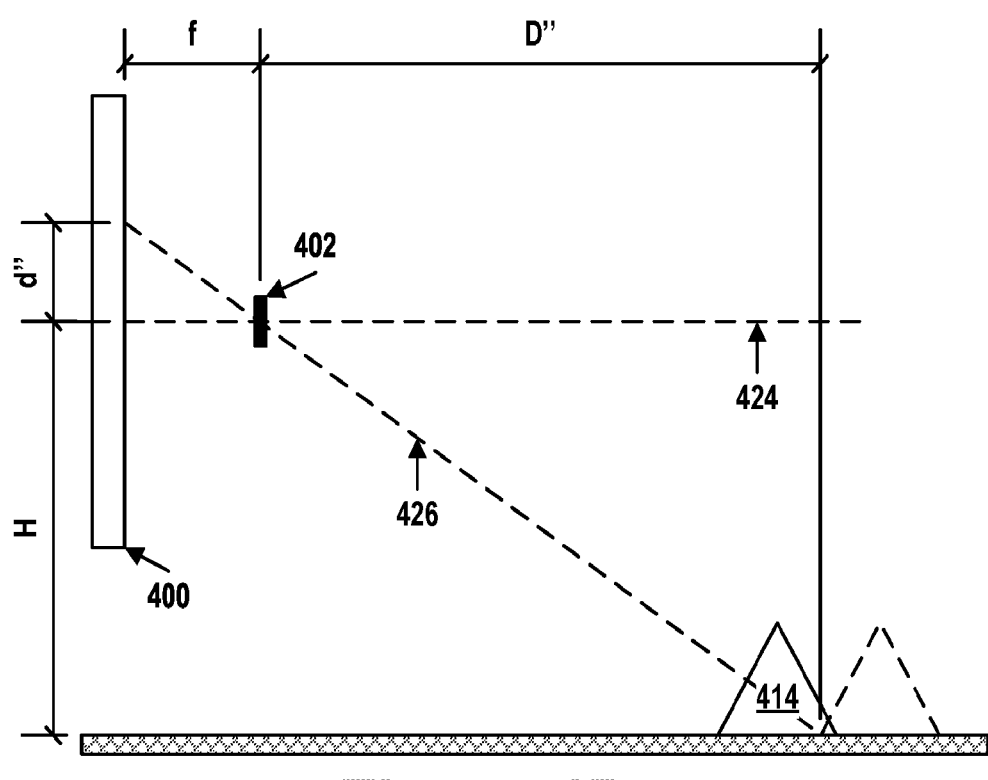

Similarly, top portion of FIG. 4D illustrates image sensor 400 shifted downwards from height H to height H", resulting in optical axis 404 moving downwards by a proportional amount, as indicated by line 424. Without this downward shift, the bottom portion of object 414 closest to image sensor 400 would create an image on image sensor 400 at a distance d above the center thereof, as indicated by line 422. However, the downward shift results in the image instead being created at distance d" (which is smaller than d) above the center of image sensor 400, as indicated by line 426.

If the mapping used to calculate the distance D between aperture 402 and object 414 corresponds to height H rather than height H", the mapping may erroneously determine that object 414 is positioned at distance D", as illustrated in the bottom portion of FIG. 4D, rather than distance D. Specifically, the bottom portion of FIG. 4D illustrates image sensor 400 shifted back up such that line 424 coincides with optical axis 404 and line 426 runs from the same point on image sensor 400 to distance D", rather than distance D, on the ground surface. Distance D" is longer than distance D, resulting in the distance estimate being an overestimate. This error may be reduced, minimized, or avoided by using a mapping that corresponds to a camera height of H" rather than H.

In some implementations, system 340 may be configured to provide a user interface by way of which the height of the camera containing image sensor 400 may be specified. Based on this specification of the height, a corresponding mapping may be selected from mappings 316-326 to be used in determining estimated physical distance 336. Thus, system 340 of FIG. 3 may generate accurate estimates of the physical distance while image sensor 400 is maintained at or near the specified height. However, as image sensor 400 deviates from the specified height, estimates of the physical distance may be erroneous, and the magnitude of the error may be proportional to the difference between the specified height and an actual height of the camera containing image sensor 400.

In other implementations, the camera may be equipped with a device configured to measure the height of the camera, and thus of image sensor 400. For example, the camera may include a light emitter and detector configured to allow for measurement of the height based on a time-of-flight of light emitted by the light emitter, reflected from the ground surface, and detected by the light detector. An inertial measurement unit (IMU) may be used to verify that the measured distance is, in fact, a height, by detecting the orientation of the camera, light emitter, and/or light detector at the time of the time-of-flight measurement. Specifically, the time-of-flight measurement may be indicative of the height when the light is emitted in a direction parallel to a gravity vector detected by the IMU. Thus, a corresponding mapping may be selected from mappings 316-326 based on a measurement of the height. As changes in the height of the camera are detected, an updated mapping may be selected to keep the height assumed by the mapping consistent with an actual height of the camera, thereby allowing for accurate distance measurements.

Figure 4E:
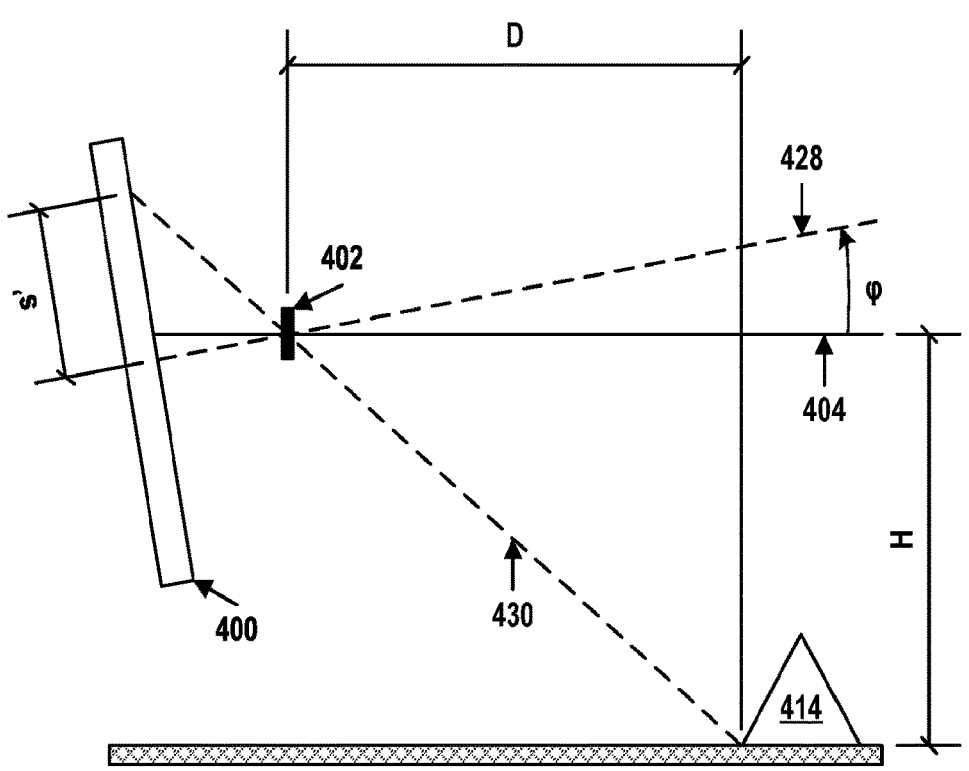
Figure 4E:
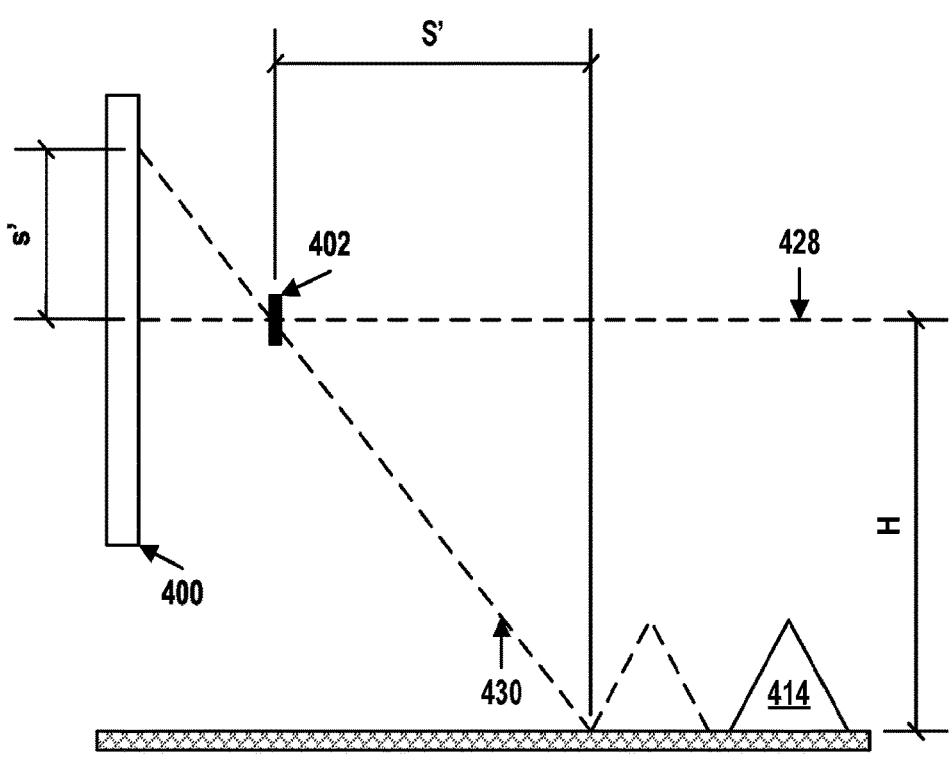

Top portion of FIG. 4E illustrates image sensor 400 tilted upwards from a zero pitch angle to a positive pitch angle φ, resulting in optical axis 404 being pitched upwards, as indicated by line 428. The height H of aperture 402 (and thus the effective height of the camera) may be unchanged by the upward tilt. Without this upward tilt, the bottom portion of object 414 closest to image sensor 400 would create an image on image sensor 400 at a distance d above the center thereof, as in FIGS. 4C and 4D. However, the upward tilt results in the image instead being created at distance s' (which is larger than d) above the center of image sensor 400, as indicated by line 430.

If the effect of pitch angle φ on the position of the bottom of object 414 on image sensor 400 is not corrected for, distance projection model 314 may erroneously determine that object 414 is positioned at distance S', as illustrated in the bottom portion of FIG. 4E, rather than at distance D. Specifically, the bottom portion of FIG. 4E illustrates image sensor 400 tilted back down such that line 428 coincides with optical axis 404 and line 430 runs from the same point on image sensor 400 to distance S', rather than distance D, on the ground surface. Distance S' is shorter than distance D, resulting in the distance estimate being an underestimate. This error may be reduced, minimized, or avoided by adding an estimated offset to the object bottom ratio determined for object 414, thereby shifting the object bottom ratio to what it would be if the pitch angle φ was zero.

Figure 4F:
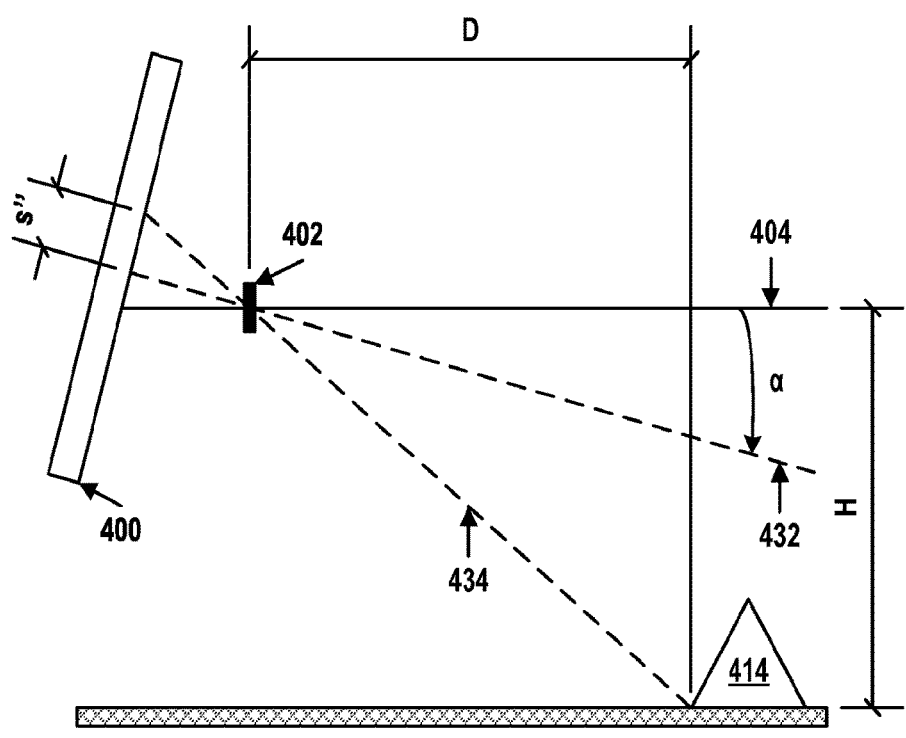
Figure 4F:
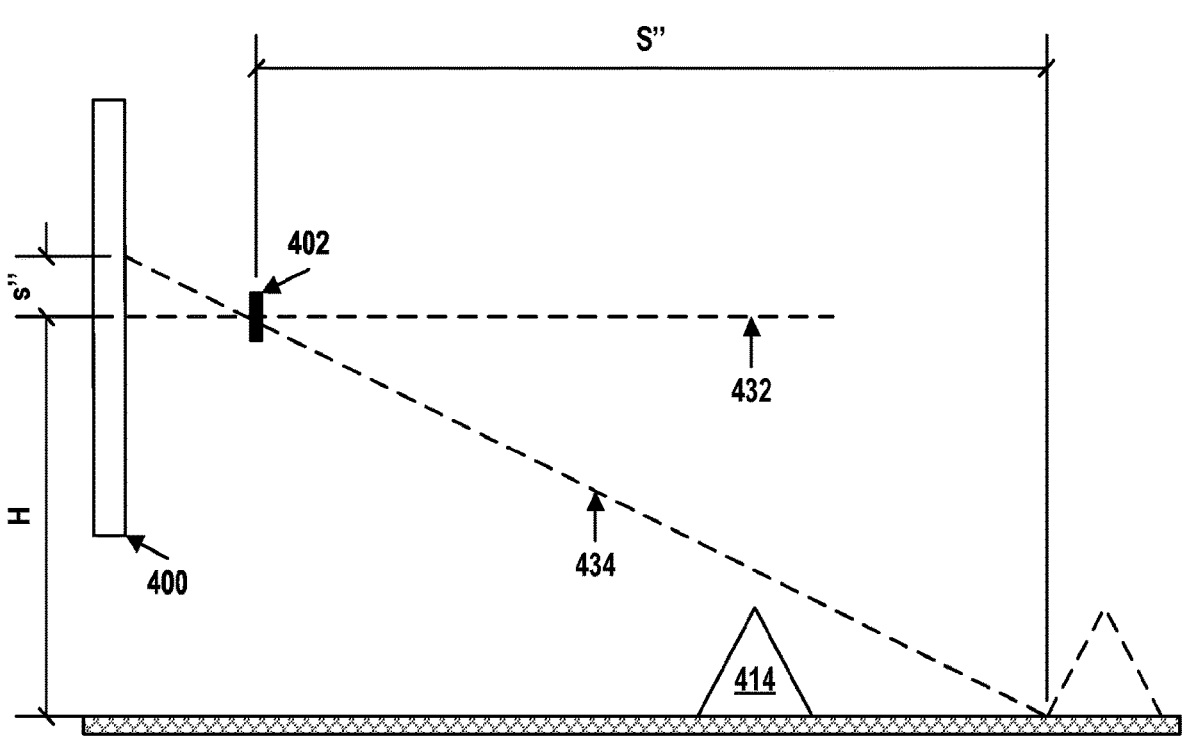

Further, top portion of FIG. 4F illustrates image sensor 400 tilted downwards from a zero pitch angle to a negative pitch angle α, resulting in optical axis 404 being pitched downwards, as indicated by line 432. The height H of aperture 402 may be unchanged by the downward tilt. Without this downward tilt, the bottom portion of object 414 closest to image sensor 400 would create an image on image sensor 400 at a distance d above the center thereof, as in FIGS. 4C and 4D. However, the downward tilt results in the image instead being created at distance s" (which is smaller than d) above the center of image sensor 400, as indicated by line 434.

If the effect of pitch angle α on the position of the bottom of object 414 on image sensor 400 is not corrected for, distance projection model 314 may erroneously determine that object 414 is positioned at distance 5", as illustrated in the bottom portion of FIG. 4F, rather than at distance D. Specifically, the bottom portion of FIG. 4F illustrates image sensor 400 tilted back up such that line 432 coincides with optical axis 404 and line 434 runs from the same point on image sensor 400 to distance S", rather than distance D, on the ground surface. Distance S" is longer than distance D, resulting in the distance estimate being an overestimate. This error may be reduced, minimized, or avoided by adding an estimated offset to the object bottom ratio determined for object 414, thereby shifting the object bottom ratio to what it would be if the pitch angle α was zero.

VI. EXAMPLE PITCH ANGLE COMPENSATION

Figure 5:
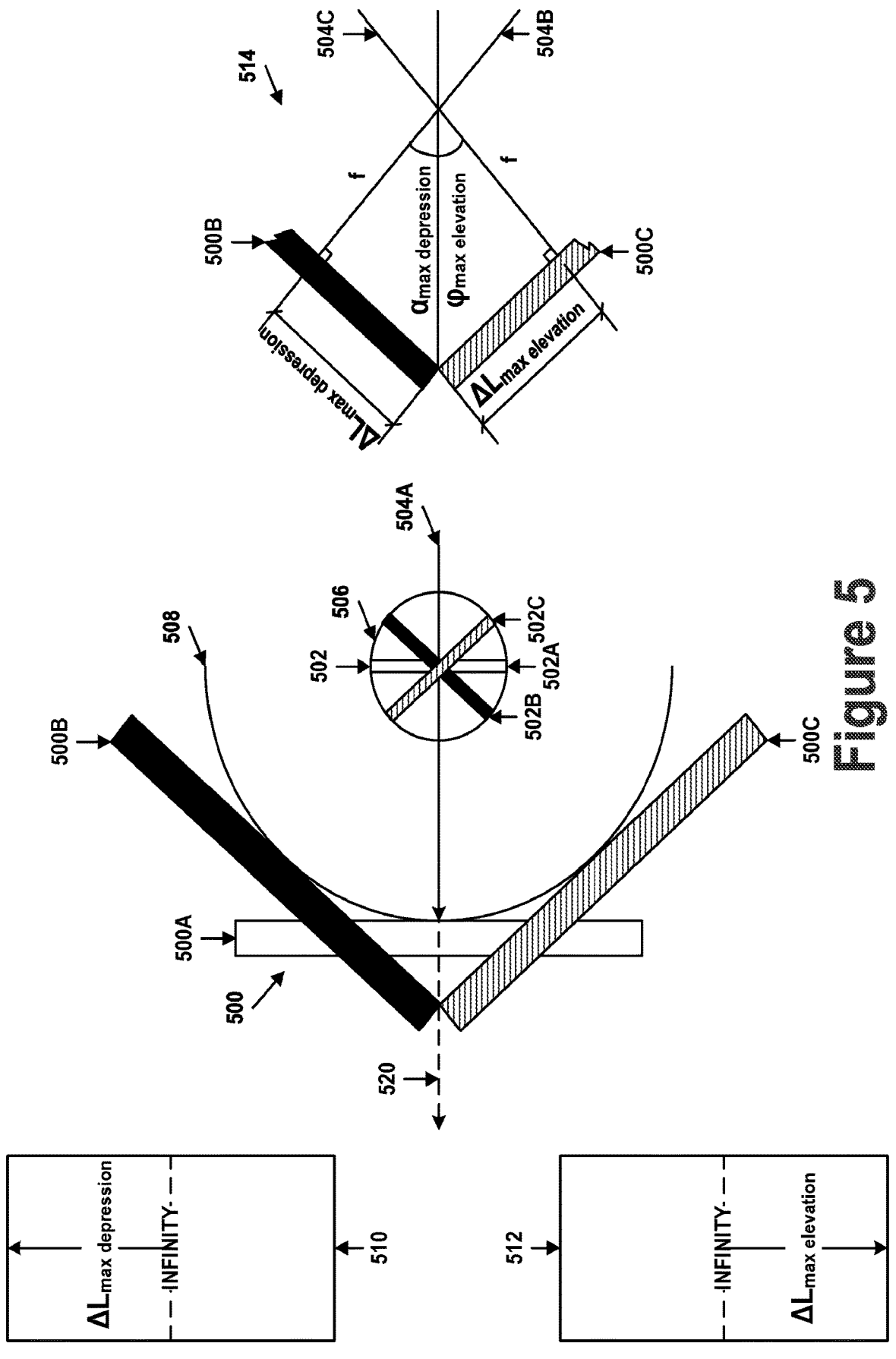
FIG. 5 illustrates compensation for camera pitch, in accordance with example embodiments.

FIG. 5 illustrates an example approach for compensating for a non-zero pitch angle of a camera. Specifically, FIG. 5 illustrates image sensor 500 and aperture 502 of a camera positioned in orientations 500A and 502A, respectively, with a zero pitch angle such that optical axis 504A runs parallel to a ground surface in the environment (e.g., runs perpendicular to a gravity vector of the environment). Infinity reference line 520 is shown projected through image sensor 500 to illustrate the apparent change in position of infinity reference line 520 with respect to image sensor 500 as image sensor 500 is tilted down from orientation 500A to orientation 500B and/or tilted up from orientation 500A to orientation 500C. Additionally, in FIG. 5, infinity reference line 520 is shown as being coincident with optical axis 504A and thus corresponding to an object bottom ratio of 0.5 when image sensor 500 is in orientation 500A. However, as the height of image sensor 500 is changed with image sensor 500 remaining in orientation 500A, infinity reference line 520 may deviate from optical axis 504A and may correspond to a different object bottom ratio (e.g., from 0.0 to 1.0, depending on the height).

As image sensor 500 and aperture 502 are tilted upwards from orientation 500A and 502A, respectively, to orientations 500C and 502C, respectively, infinity reference line 520 moves upwards relative to image sensor 500. During this upward tilting, aperture 502 rotates within reference trace 506 and image sensor 500 moves along focal trace 508 having a radius equal to a focal length f of the camera. Thus, the upward tilting represents a positive change in the pitch angle while keeping the height H of the camera relative to the ground surface constant. Positive pitch angles may be considered elevation angles, while negative pitch angles may be considered depression angles.

With image sensor 500 in orientation 500C, infinity reference line 520 coincides with a topmost portion of image sensor 500. Thus, in orientation 500C, infinity reference line 520 is shifted downward within corresponding image data 512 by a screen ratio of $\Delta L_{max\ elevation}$. Infinity reference line 520 is shifted downward, rather than upward, within image data 512 because images formed on image sensor 500 are up-side-down (i.e., inverted), and the output of image sensor 500 is thus inverted to make objects appear right-side-up when the image data is displayed. When infinity reference line 520 coincides with the middle of image sensor 500 when image sensor 500 is in orientation 500A, $\Delta L_{max\ elevation}$ may be equal to 0.5. However, $\Delta L_{max\ elevation}$ may take on other values depending on the height at which image sensor 500 is placed in the environment.

Similarly, as image sensor 500 and aperture 502 are tilted downwards from orientation 500A and 502A, respectively, to orientations 500B and 502B, respectively, infinity reference line 520 moves downwards relative to image sensor 500. During this downward tilting, aperture 502 rotates within reference trace 506 and image sensor 500 moves along focal trace 508. Thus, the downward tilting represents a negative change in the pitch angle while keeping the height H of the camera relative to the ground surface constant. With image sensor 500 in orientation 500B, infinity reference line 520 coincides with a bottommost portion of image sensor 500. Thus, in orientation 500B, infinity reference line 520 is shifted upward within corresponding image data 510 by a screen ratio of $\Delta L_{max\ depression}$ Infinity reference line 520 is shifted upward, rather than downward, within image data 510 due to the inversion of images formed on image sensor 500.

When infinity reference line 520 coincides with the middle of image sensor 500 when image sensor 500 is in orientation 500A, $\Delta L_{max\ depression}$ may be equal to 0.5. However, $\Delta L_{max\ depression}$ may take on other values depending on the height of image sensor 500. Regardless of the height at which image sensor 500 is placed, the sum of $\Delta L_{max\ elevation}$ and $\Delta L_{max\ depression}$ may be equal to 1.0.

Geometric model 514 illustrates orientations 500B and 500C of image sensor 500, and may be used to determine a mathematical relationship that may be used to compensate for changes in the pitch angle of the camera. Specifically, geometric model 514 illustrates that orientation 500B corresponds to a negative pitch angle $\alpha_{max\ depression}$, a rotation of optical axis 504A to orientation 504B, and an offset of the object bottom ratio associated with infinity reference line 520 by $\Delta L_{max\ depression}$ Thus, $\tan(\alpha_{max\ depression})=\Delta L_{max\ depression}/f$, and $f=\Delta L_{max\ depression}/\tan(\alpha_{max\ depression})$ Accordingly, for rotations of the camera (i.e., image sensor 500 and aperture 502) by pitch angle 9 between $\alpha_{max\ depression}$ and $\varphi_{max\ elevation}$, the offset of the object bottom ratio $\Delta b$ is modeled by $\Delta b=f\tan(\theta)$ or, equivalently, $\Delta b=(\Delta L_{max\ depression}/\tan(\alpha_{max}))\tan(\theta)$. This equation may be used or implemented by offset calculator 312 to determine an estimated offset that compensates for camera pitch 306 associated with image data 300. Since estimated offset $\Delta b$ is calculated in terms of an object bottom ratio (rather than, e.g., number of pixels), estimated offset $\Delta b$ may be directly added to the object bottom ratio calculated by object bottom ratio calculator 310.

Notably, for a camera that is symmetric, $\alpha_{max\ depression}$ and $\varphi_{max\ elevation}$ may have the same magnitude, but may indicate a different direction of camera pitch. Accordingly, a corresponding mathematical relationship may be determined on the basis of $\varphi_{max\ elevation}$, rather than $\alpha_{max\ depression}$ as done above. Specifically, orientation 500C corresponds to a positive pitch angle $\varphi_{max\ elevation}$, a rotation of optical axis 504A to orientation 504C, and an offset of the object bottom ratio associated with infinity reference line 520 by $\Delta L_{max\ elevation}$. Thus, and $\tan(\varphi_{max\ elevation})=\Delta L_{max\ elevation}/f$, and $f=\Delta L_{max\ elevation}/\tan(\varphi_{max\ elevation})$. Accordingly, for rotations of image sensor 500 by pitch angle $\theta$ between $\alpha_{max\ depression}$ and $\varphi_{max\ elevation}$, the offset of the object bottom ratio $\Delta b$ is modeled by $\Delta b=f\tan(\theta)$ or, equivalently, $\Delta b=(\Delta L_{max\ elevation}/\tan(\varphi_{max\ elevation}))\tan(\theta)$. Estimated offset $\Delta b$ may be positive for positive pitch angles (resulting in the object bottom ratio being increased when summed with the offset) and negative for negative pitch angles (resulting in the object bottom ratio being decreased when summed with the offset).

The values of $\alpha_{max\ depression}$ and $\varphi_{max\ elevation}$ may be determined empirically by way of a calibration procedure for the camera. During the calibration procedure, the camera may be tilted down or up until infinity reference line 520 is moved to the bottom or top, respectively, of image sensor 500, resulting in the offsets shown in images 510 or 512, respectively. That is, the calibration may be done by placing image sensor 500 and aperture 502 in orientations 500B and 502B, respectively, and measuring the values of $\alpha_{max\ depression}$ and $\Delta L_{max\ depression}$, or in orientations 500C and 502C, respectively, and measuring the values of $\varphi_{max\ elevation}$ and $\Delta L_{max\ elevation}$ in these orientations. The determined values of Amax depression and $\varphi_{max\ elevation}$ may be valid for cameras having similar or substantially the same arrangement of optical components, including similar or substantially the same lenses, similar or substantially the same sensor size (i.e., length and width), similar or substantially the same focal length f, and/or similar or substantially the same aspect ratio of generated image data. When one or more of these camera parameters differ, the values of $\alpha_{max\ depression}$ and $\varphi_{max\ elevation}$ may be empirically re-determined.

VII. EXAMPLE USE CASES

Figure 6:
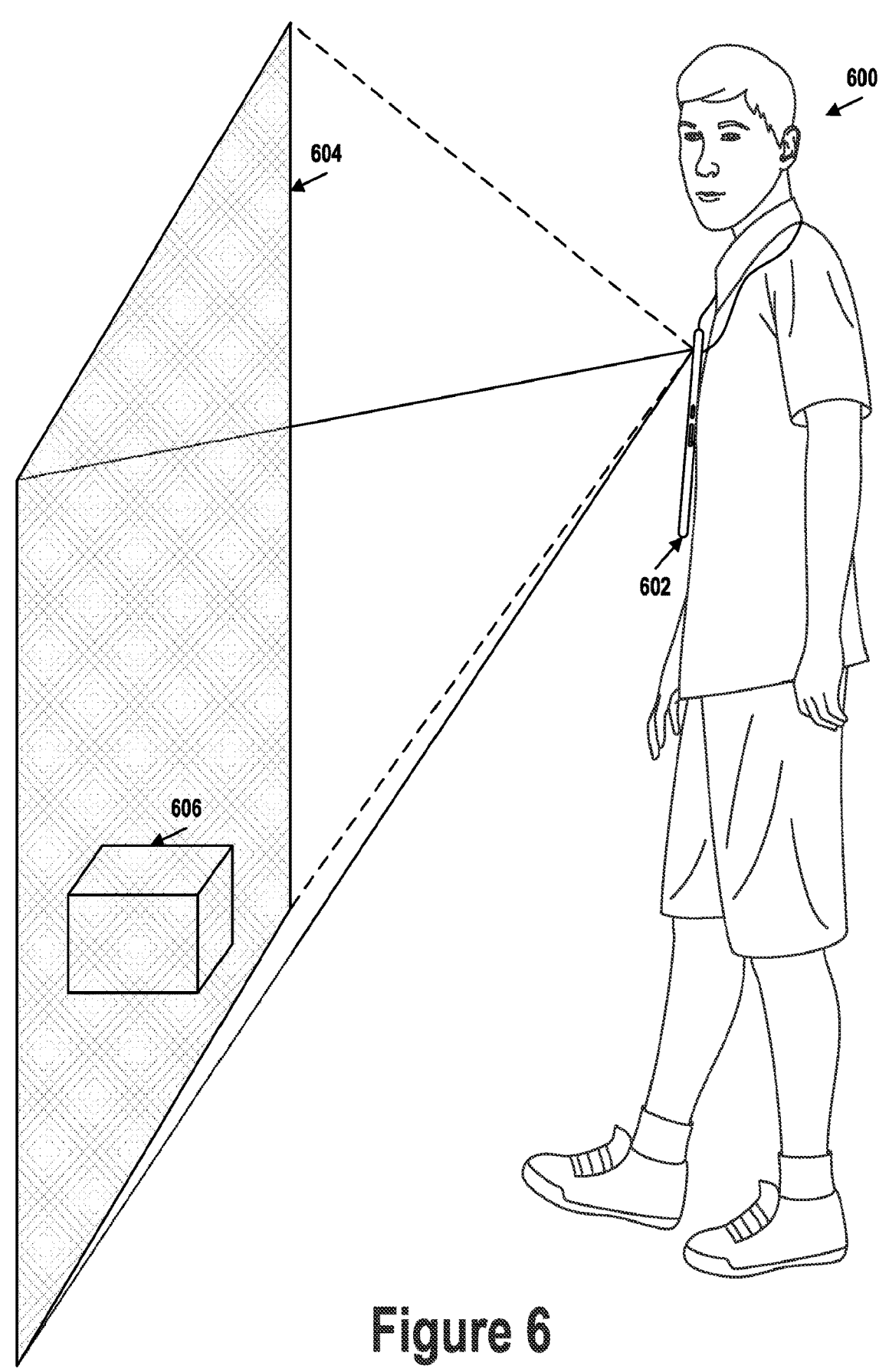
FIG. 6 illustrates a use case of a system for estimating object distance, in accordance with example embodiments.

FIG. 6 illustrates an example use case for the depth determination models, systems, devices, and techniques disclosed herein. Specifically, FIG. 6 illustrates user 600 wearing computing device 602 at approximately chest height. Computing device 602 may correspond to computing system 100, and/or computing device 200, and may include a camera and an implementation of system 340. Computing device 602 may be hung around a neck of user 600 by way of a lanyard, cord, strap, or other connecting mechanism. Alternatively, computing device 602 may be connected to the body of user 600 at different positions and/or through different connection mechanisms. Thus, while user 600 walks through the environment, computing device 602 and the camera thereof may be positioned at a substantially fixed height (that allows for some height variations resulting from movement of user 600) above the ground surface of the environment. Accordingly, distance projection model 314 may select, from mappings 316-326, a mapping corresponding to this substantially fixed height, and may thus be used to determine distances to objects detected within the environment.

Specifically, the camera on computing device 602 may capture image data that represents the environment, including object 606, as indicated by field of view 604. Based on this image data, which may correspond to image data 300, system 340 of FIG. 3 may be used to determine estimated physical distance 336 between object 606 and computing device 602, the camera thereof, and/or user 600. Based on estimated physical distance 336, computing device 602 may be configured to generate a representation of physical distance 336. The representation may be visual, audible, and/or haptic, among other possibilities. Thus, the depth determination techniques discussed herein may be used, for example, to assist visually impaired individuals with traversing an environment by informing such users of the distances to various objects in the environment.

For example, computing device 602 may display, on a display thereof, an indication of estimated physical distance 336 in proximity to a displayed representation of object 606, thereby indicating that object 606 is horizontally separated from computing device 602 by estimated physical distance 336. In another example, computing device 602 may generate, by way of one or more speakers, an utterance that represents estimated physical distance 336. In some cases, this utterance may also indicate a classification of the object (e.g., human, vehicle, animal, stationary object, etc.) and/or a horizontal direction of object 606 relative to a vertical centerline of a screen of computing device 602. Thus, the utterance may be, for example, "Box at 2 meters, 1 o'clock," where 1 o'clock uses the clock position to indicate a horizontal direction of 30 degrees relative to the vertical centerline. In a further example, a haptic representation of estimated physical distance 336 may be generated by way of vibrations of computing device 602, where the pattern of vibrations encodes information about the distance and orientation of object 606 relative to user 600.

Further, in some implementations, computing device 602 may allow user 600 to specify a portion of field of view 604 (i.e., a portion of a display of computing device 602) as active, and another portion of field of view 604 as inactive. Based on this specification, computing device 602 may be configured to generate distance estimates for objects that are at least partially contained within the active portion of field of view 604, and omit generating such distance estimates for objects that are not at least partially within the active portion (i.e., objects entirely within the inactive portion of field of view 604). For example, a visually impaired individual might wish to use computing device 602 to measure distances to objects found in front of the user along an expected walking path, but might not be interested in distances to objects found next to the walking path. Thus, such a user might specify as active a rectangular portion of the display of computing device 602 having a height equal to the display height and a width smaller than the display width, thus causing computing device 602 to ignore objects represented in image data near the edges of the display.

Additionally, in some implementations, computing device 602 may allow user 600 to specify classes or types of objects for which distances are to be measured. Based on this specification, computing device 602 may be configured to generate distance estimates for objects classified into one of the specified classes or types, and omit generating such distance estimates for objects that are not within the specified classes or types. For example, the visually impaired individual might wish to use computing device 602 to measure distances to moving objects such as other humans, vehicles, and animals, but might not be interested in distances to non-moving objects such as benches, light posts, and/or mailboxes.

VIII. ADDITIONAL EXAMPLE OPERATIONS

FIG. 7 illustrates a flow chart of operations related to determining an estimate of a distance between an object and a camera. The operations may be carried out by one or more of computing system 100, computing device 200, system 340, and/or computing device 602, and/or various other types of devices or device subsystems. The embodiments of FIG. 7 may be simplified by the removal of any one or more of the features shown therein. Further, these embodiments may be combined with features, aspects, and/or implementations of any of the previous figures or otherwise described herein.

Block 700 may involve receiving, from a camera, image data representing an object in an environment.

Block 702 may involve determining, based on the image data, a vertical position within the image data of a bottom of the object.

Block 704 may involve determining an object bottom ratio between the vertical position and a height of the image data.

Block 706 may involve determining, by way of a distance projection model and based on the object bottom ratio, an estimate of a physical distance between the camera and the object. The distance projection model may define, for each respective candidate object bottom ratio of a plurality of candidate object bottom ratios, a mapping between (i) the respective candidate object bottom ratio and (ii) a corresponding physical distance in the environment.

Block 708 may involve generating an indication of the estimate of the physical distance between the camera and the object.

In some embodiments, the mapping may be based on an assumption that the camera is disposed at a predetermined height within the environment.

In some embodiments, when a physical height of the camera is above the predetermined height while capturing the image data, the estimate of the physical distance between the camera and the object may be an underestimate. When the physical height of the camera is below the predetermined height while capturing the image data, the estimate of the physical distance between the camera and the object may be an overestimate.

In some embodiments, a specification of the predetermined height may be received by way of a user interface associated with the camera. Based on the specification of the predetermined height, the distance projection model may be configured by modifying the mapping to assume that the camera is positioned according to the specification of the predetermined height.

In some embodiments, configuring the distance projection model may include, based on the specification of the predetermined height, selecting the mapping from a plurality of candidate mappings. Each respective mapping of the plurality of candidate mappings may be associated with a corresponding specification of the predetermined height.

In some embodiments, the distance projection model may include a machine learning model. Configuring the distance projection model may include adjusting at least one input parameter of the machine learning model based on the specification of the predetermined height.

In some embodiments, the mapping may be based on a geometric model of the camera. The geometric model may include: (i) the camera having a focal length and being disposed at the predetermined height within the environment, (ii) an optical axis of the camera oriented substantially parallel to a ground surface of the environment, and (iii) each respective line of a plurality of lines projected from a respective point on an image sensor of the camera to a corresponding point on the ground surface of the environment. Each respective candidate object bottom ratio may be associated with the corresponding physical distance in the environment based on the geometric model.

In some embodiments, the mapping may include (i) a first mapping corresponding to a portrait orientation of the camera and (ii) a second mapping corresponding to a landscape orientation of the camera. Each respective candidate object bottom ratio associated with the first mapping may be between a corresponding vertical position within portrait image data and a height of the portrait image data. Each respective candidate object bottom ratio associated with the second mapping may be between a corresponding vertical position within landscape image data and a height of the landscape image data. The height of the image data may be determined based on an orientation of the camera while capturing the image data. Based on the orientation of the camera while capturing the image data, the first mapping or the second mapping may be selected to be used in determining the estimate of the physical distance between the camera and the object.

In some embodiments, sensor data indicative of a pitch angle of the camera may be obtained from one or more sensors associated with the camera. Based on the sensor data indicative of the pitch angle of the camera, an estimated offset of the object bottom ratio may be determined. The estimated offset of the object bottom ratio may account for a change in the vertical position caused by the pitch angle of the camera relative to a zero pitch angle. A sum of the object bottom ratio and the estimated offset may be determined.

The distance projection model may be configured to determine the estimate of the physical distance between the camera and the object based on the sum.

In some embodiments, determining the estimated offset of the object bottom ratio may include determining a product of an estimated focal length of the camera and a tangent of the pitch angle of the camera. Positive pitch angles associated with an upward tilt of the camera may result in an estimated offset having a positive value such that the sum is higher than the object bottom ratio. Negative pitch angles associated with a downward tilt of the camera may result in an estimated offset having a negative value such that the sum is lower than the object bottom ratio.

In some embodiments, the estimated focal length may be based on at least one of (i) a determination of a maximum pitch angle that offsets an infinity reference line from an initial position on an image sensor of the camera to a top of the image sensor by a first screen ratio or (ii) a determination of a minimum pitch angle that offsets the infinity reference line from the initial position on the image sensor to a bottom of the image sensor by a second screen ratio, wherein a sum of the first screen ratio and the second screen ratio is equal to one.

In some embodiments, the plurality of candidate object bottom ratios may range from (i) a first candidate object bottom ratio of zero and corresponding to a minimum measurable physical distance to (ii) a second candidate object bottom ratio corresponding to a maximum measurable physical distance.

In some embodiments, determining the vertical position within the image data of the bottom of the object may include determining, by way of one or more object detection algorithms, a region of interest within the image data corresponding to a position of the object within the image data. The bottom of the object may be identified by way of one or more object bottom detection algorithms and based on the region of interest. Based on identifying the bottom of the object, it may be determined that the bottom of the object is in contact with a ground surface of the environment. Based on determining that the bottom of the object is in contact with the ground surface, the vertical position within the image data of the bottom of the object may be determined.

In some embodiments, additional image data representing an additional object in the environment may be received from the camera. Based on the additional image data, it may be determined that a bottom of the additional object is not visible within the image data. Based on determining that the bottom of the additional object is not visible within the image data, it may be determining that an additional estimate of a physical distance between the camera and the additional object is a predetermined value below a minimum measurable physical distance. An additional indication of the additional estimate of the physical distance between the camera and the additional object may be generated.

In some embodiments, generating the indication of the estimate of the physical distance between the camera and the object may include one or more of: (i) displaying a visual representation of the estimate of the physical distance on a display, (ii) generating an audible utterance that represents the estimate of the physical distance, or (iii) generating a haptic representation of the estimate of the physical distance.

In some embodiments, a designation of an active portion of a field of view of the camera may be received. It may be determined that at least a portion of the object is contained within the active portion of the field of view of the camera. The indication of the estimate of the physical distance between the camera and the object may be generated based on determining that at least the portion of the object is contained within the active portion of the field of view of the camera. Generation of indications of respective estimates of physical distances between the camera and corresponding objects may be omitted for objects outside the active portion of the field of view of the camera.

In some embodiments, a selection of one or more object classes from a plurality of object classes may be received. It may be determined that the object belongs to a first object class of the one or more object classes. The indication of the estimate of the physical distance between the camera and the object may be generated based on determining that the object belongs to the first object class. Generation of indications of respective estimates of physical distances between the camera and corresponding objects may be omitted for objects that do not belong to the first object class.

IX. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:

receiving, from a camera, image data representing an object in an environment;

receiving, from a sensor associated with the camera, sensor data indicative of a pitch angle of the camera;

determining, based on the image data, a vertical position within the image data of a bottom of the object;

determining an object bottom ratio between the vertical position and a height of the image data;

determining, based on the sensor data indicative of the pitch angle of the camera, an estimated offset of the object bottom ratio that accounts for a change in the vertical position caused by the pitch angle of the camera relative to a zero pitch angle, wherein each of the object bottom ratio and the estimated offset of the object bottom ratio is unitless;

determining, by way of a distance projection model and based on the object bottom ratio and the estimated offset of the object bottom ratio, an estimate of a physical distance between the camera and the object, wherein the distance projection model defines, for each respective candidate object bottom ratio of a plurality of candidate object bottom ratios, a mapping between (i) the respective candidate object bottom ratio and (ii) a corresponding physical distance in the environment; and generating an indication of the estimate of the physical distance between the camera and the object.

2. The computer-implemented method of claim 1, wherein the mapping is based on an assumption that the camera is positioned at a predetermined height within the environment.

3. The computer-implemented method of claim 2, wherein, when a physical height of the camera is above the predetermined height while capturing the image data, the estimate of the physical distance between the camera and the object is an underestimate, and wherein, when the physical height of the camera is below the predetermined height while capturing the image data, the estimate of the physical distance between the camera and the object is an overestimate.

4. The computer-implemented method of claim 2, further comprising:

receiving, by way of a user interface associated with the camera, a specification of the predetermined height; and based on the specification of the predetermined height, configuring the distance projection model by modifying the mapping to assume that the camera is positioned according to the specification of the predetermined height.

5. The computer-implemented method of claim 4, wherein configuring the distance projection model comprises:

based on the specification of the predetermined height, selecting the mapping from a plurality of candidate mappings, wherein each respective candidate mapping of the plurality of candidate mappings is associated with a corresponding specification of the predetermined height.

6. The computer-implemented method of claim 4, wherein the distance projection model comprises a machine learning model, and wherein configuring the distance projection model comprises:

adjusting at least one input parameter of the machine learning model based on the specification of the predetermined height.

7. The computer-implemented method of claim 2, wherein the mapping is based on a geometric model of the camera, wherein the geometric model comprises: (i) the camera having a focal length and being disposed at the predetermined height within the environment, (ii) an optical axis of the camera oriented substantially parallel to a ground surface of the environment, and (iii) each respective line of a plurality of lines projected from a respective point on an image sensor of the camera to a corresponding point on the ground surface of the environment, and wherein each respective candidate object bottom ratio of the plurality of candidate object bottom ratios is associated with the corresponding physical distance in the environment based on the geometric model.

8. The computer-implemented method of claim 1, wherein the mapping comprises (i) a first mapping corresponding to a portrait orientation of the camera and (ii) a second mapping corresponding to a landscape orientation of the camera, wherein each respective candidate object bottom ratio associated with the first mapping is between a corresponding vertical position within portrait image data and a height of the portrait image data, wherein each respective candidate object bottom ratio associated with the second mapping is between a corresponding vertical position within landscape image data and a height of the landscape image data, and wherein the method further comprises:

determining the height of the image data based on an orientation of the camera while capturing the image data; and selecting, based on the orientation of the camera while capturing the image data, the first mapping or the second mapping to use in determining the estimate of the physical distance between the camera and the object.

9. The computer-implemented method of claim 1, wherein determining the estimate of the physical distance based on the object bottom ratio and the estimated offset of the object bottom ratio comprises:

determining a sum of the object bottom ratio and the estimated offset of the object bottom ratio, wherein the distance projection model is configured to determine the estimate of the physical distance between the camera and the object based on the sum.

10. The computer-implemented method of claim 1, wherein determining the estimated offset of the object bottom ratio comprises:

determining a product of an estimated focal length of the camera and a tangent of the pitch angle of the camera, wherein positive pitch angles associated with an upward tilt of the camera result in the estimated offset of the object bottom ratio having a positive value such that a sum of the object bottom ratio and the estimated offset of the object bottom ratio is higher than the object bottom ratio, and wherein negative pitch angles associated with a downward tilt of the camera result in the estimated offset of the object bottom ratio having a negative value such that the sum is lower than the object bottom ratio.

11. The computer-implemented method of claim 10, wherein the estimated focal length is based on at least one of (i) a determination of a maximum pitch angle that offsets an infinity reference line from an initial position on an image sensor of the camera to a top of the image sensor by a first screen ratio or (ii) a determination of a minimum pitch angle that offsets the infinity reference line from the initial position on the image sensor to a bottom of the image sensor by a second screen ratio, wherein a sum of the first screen ratio and the second screen ratio is equal to one.

12. The computer-implemented method of claim 1, wherein the plurality of candidate object bottom ratios ranges from (i) a first candidate object bottom ratio of zero and corresponding to a minimum measurable physical distance to (ii) a second candidate object bottom ratio corresponding to a maximum measurable physical distance.

13. The computer-implemented method of claim 1, wherein determining the vertical position within the image data of the bottom of the object comprises:

determining, by way of one or more object detection algorithms, a region of interest within the image data corresponding to a position of the object within the image data;

identifying, by way of one or more object bottom detection algorithms and based on the region of interest, the bottom of the object;

based on identifying the bottom of the object, determining that the bottom of the object is in contact with a ground surface of the environment; and based on determining that the bottom of the object is in contact with the ground surface, determining the vertical position within the image data of the bottom of the object.

14. The computer-implemented method of claim 1, further comprising:

receiving, from the camera, additional image data representing an additional object in the environment;

determining, based on the additional image data, that a bottom of the additional object is not visible within the additional image data;

based on determining that the bottom of the additional object is not visible within the additional image data, determining that an additional estimate of a physical distance between the camera and the additional object is a predetermined value below a minimum measurable physical distance; and generating an additional indication of the additional estimate of the physical distance between the camera and the additional object.

15. The computer-implemented method of claim 1, wherein generating the indication of the estimate of the physical distance between the camera and the object comprises one or more of: (i) displaying a visual representation of the estimate of the physical distance on a display, (ii) generating an audible utterance that represents the estimate of the physical distance, or (iii) generating a haptic representation of the estimate of the physical distance.

16. The computer-implemented method of claim 1, further comprising:

receiving a designation of an active portion of a field of view of the camera;

determining that at least a portion of the object is contained within the active portion of the field of view of the camera; and generating the indication of the estimate of the physical distance between the camera and the object based on determining that at least the portion of the object is contained within the active portion of the field of view of the camera, wherein generation of indications of respective estimates of physical distances between the camera and corresponding objects is omitted for objects outside the active portion of the field of view of the camera.

17. The computer-implemented method of claim 1, further comprising:

receiving a selection of one or more object classes from a plurality of object classes;

determining that the object belongs to a first object class of the one or more object classes; and generating the indication of the estimate of the physical distance between the camera and the object based on determining that the object belongs to the first object class, wherein generation of indications of respective estimates of physical distances between the camera and corresponding objects is omitted for objects that do not belong to the first object class.

18. A computing system comprising:

a camera;

a sensor configured to generate sensor data indicative of a pitch angle of the camera;

a processor; and a non-transitory computer-readable storage medium having stored thereon instructions that, when executed by the processor, cause the processor to perform operations comprising:

receiving, from the camera, image data representing an object in an environment;

receiving, from the sensor, the sensor data indicative of the pitch angle of the camera;

determining, based on the image data, a vertical position within the image data of a bottom of the object;

determining an object bottom ratio between the vertical position and a height of the image data;

determining, based on the sensor data indicative of the pitch angle of the camera, an estimated offset of the object bottom ratio that accounts for a change in the vertical position caused by the pitch angle of the camera relative to a zero pitch angle, wherein each of the object bottom ratio and the estimated offset of the object bottom ratio is unitless;

determining, by way of a distance projection model and based on the object bottom ratio and the estimated offset of the object bottom ratio, an estimate of a physical distance between the camera and the object, wherein the distance projection model defines, for each respective candidate object bottom ratio of a plurality of candidate object bottom ratios, a mapping between (i) the respective candidate object bottom ratio and (ii) a corresponding physical distance in the environment; and generating an indication of the estimate of the physical distance between the camera and the object.

19. The computing system of claim 18, wherein determining the estimate of the physical distance based on the object bottom ratio and the estimated offset of the object bottom ratio comprises:

determining a sum of the object bottom ratio and the estimated offset of the object bottom ratio, wherein the distance projection model is configured to determine the estimate of the physical distance between the camera and the object based on the sum.

20. A non-transitory computer-readable storage medium having stored thereon instructions that, when executed by a computing system, cause the computing system to perform operations comprising:

receiving, from a camera, image data representing an object in an environment;

receiving, from a sensor associated with the camera, sensor data indicative of a pitch angle of the camera;

determining, based on the image data, a vertical position within the image data of a bottom of the object;

determining an object bottom ratio between the vertical position and a height of the image data;

determining, based on the sensor data indicative of the pitch angle of the camera, an estimated offset of the object bottom ratio that accounts for a change in the vertical position caused by the pitch angle of the camera relative to a zero pitch angle, wherein each of the object bottom ratio and the estimated offset of the object bottom ratio is unitless;

determining, by way of a distance projection model and based on the object bottom ratio and the estimated offset of the object bottom ratio, an estimate of a physical distance between the camera and the object, wherein the distance projection model defines, for each respective candidate object bottom ratio of a plurality of candidate object bottom ratios, a mapping between (i) the respective candidate object bottom ratio and (ii) a corresponding physical distance in the environment; and generating an indication of the estimate of the physical distance between the camera and the object.

* * * * *